United States Patent [19] [11] Patent Number: 5,343,216
Katayama et al. [45] Date of Patent: Aug. 30, 1994

[54] ACTIVE MATRIX SUBSTRATE AND ACTIVE MATRIX DISPLAY APPARATUS

[75] Inventors: Mikio Katayama, Ikoma; Hiroaki Kato, Nara; Takayoshi Nagayasu, Nara; Akihiko Imaya, Nara; Hidenori Negoto, Ikoma; Yuzuru Kanemori, Tenri; Toshihiko Hirobe, Sakai, all of Japan

[73] Assignee: Sharp Kabushiki Kaisha, Osaka, Japan

[21] Appl. No.: 24,806

[22] Filed: Mar. 1, 1993

Related U.S. Application Data

[63] Continuation of Ser. No. 864,534, Apr. 7, 1992, abandoned, and Ser. No. 472,604, Jan. 30, 1990, Pat. No. 5,151,807.

[30] Foreign Application Priority Data

Jan. 31, 1989 [JP] Japan .................... 1-23486
Jun. 21, 1989 [JP] Japan .................... 1-159901
Aug. 14, 1989 [JP] Japan .................... 1-209769

[51] Int. Cl.5 .............................. G09G 3/36
[52] U.S. Cl. .............................. 345/92; 345/93; 359/59
[58] Field of Search .............. 359/59, 87; 357/23.7, 357/45, 4, 51; 340/784; 345/87, 92, 93

[56] References Cited

U.S. PATENT DOCUMENTS 4,907,861 3/1990 Muto ............................ 357/4
4,912,066 3/1990 Wills ........................... 357/51

FOREIGN PATENT DOCUMENTS 0276853 8/1988 European Pat. Off. .
61-153619 7/1986 Japan .
63-279227 11/1988 Japan .

OTHER PUBLICATIONS

Patent Abstracts of Japan, vol. 11, No. 195, Group E-518, (Jun. 23, 1987).

Primary Examiner—Ulysses Weldon
Assistant Examiner—Matthew Luu
Attorney, Agent, or Firm—Morrison & Foerster

[57] ABSTRACT

An active matrix substrate comprising picture element electrodes disposed in a matrix on a substrate, each of which is composed of divided electrodes, and an electrically conductive film on which two of said divided electrodes adjacent to each other are superposed in a manner to sandwich an insulating film therebetween so as to form a connection. The connection is irradiated with laser beams from the outside of the display apparatus when one of the divided electrodes brings about a picture element defect, so that both the divided electrodes can be electrically connected to each other, thereby attaining a correction of the picture element defect. A display apparatus using the active matrix substrate is also provided.

17 Claims, 17 Drawing Sheets

ACTIVE MATRIX SUBSTRATE AND ACTIVE MATRIX DISPLAY APPARATUS

This application is a continuation of application Ser. Nos. 07/864,534 and 07/472,604, filed Apr. 7, 1992 now abandoned and Jan. 30, 1990 now U.S. Pat. No. 5,151,807.

BACKGROUND OF THE INVENTION

1. Field of the Invention

The present invention relates to an active matrix substrate for constructing a matrix-type display apparatus in combination with a display medium, such as liquid crystal, EL light emission layer or plasma luminosity, and to an active matrix display apparatus using the substrate.

2. Description of the Prior Art

Conventionally, high image-quality matrix display apparatuses have used an active matrix driving system, in which an individual picture element electrode is selected by a switching element so that a plurality of selected picture element electrodes form a display pattern.

FIG. 24 is a plan view of the portion of a conventional active matrix substrate, in which gate bus lines 9 functioning as scanning lines extend in parallel to each other between picture element electrodes 8 and a gate electrode 2 branches from each gate bus line 9. A thin film transistor (to be hereinafter referred to as TFT) 11 is formed as a switching element on the gate electrode 2. Source bus lines 10 perpendicularly intersecting with the gate bus lines 9 and serving as signal lines extend in parallel to each other. A source electrode 7a of the TFT 11 is connected to each source bus line 10 and a drain electrode 7b of the TFT 11 is connected to a picture element electrode 8. Between each gate bus line 9 and each source bus line 10 is formed a gate insulating film formed on the entire surface of the substrate. Between the aforesaid active matrix substrate and an opposite substrate is charged a display medium, such as liquid crystal or the like, resulting in an active matrix display apparatus. Voltage is applied to the display medium between the picture element electrode 8 of the active matrix substrate and an opposite electrode of the opposite substrate, so that the display apparatus performs a display.

Usually, several ten thousands to hundred thousands of picture element electrodes are formed on an active matrix substrate of a display apparatus in order to perform an accurate image display. With the active matrix display apparatus having so many picture element electrodes, picture element defects arise. A factor causing the picture element defects includes poor resist and/or poor etching during the patterning in a TFT formation process, an occurrence of defects on a film in the thin film formation process, mixture of conductive foreign objects into the liquid crystal, and the like. These picture element defects remarkably deteriorate the image quality, causing a low production yield of the display apparatus.

In order to reduce deterioration of image quality when picture element defects occur, it is proposed to use an active matrix substrate shown in FIG. 25. In the active matrix substrate, a picture element electrode 8 is divided into two divided electrodes 20 and 21, which are provided across a gap 23. The divided electrodes 20 and 21 are connected with TFTs 11a and 11b by means of drain electrodes 22a and 22b respectively. Source electrodes 21a and 21b of the TFTs 11a and 11b are connected to the same source bus line 10, a gate electrode 2 common to the TFTs 11a and 11b being connected to a gate bus line 9. Accordingly, the divided electrodes 20 and 21 are simultaneously driven by the same gate bus line 9 and source bus line 10.

FIG. 26 is a sectional view of a display apparatus using the substrate, taken on the line J—J in FIG. 25. On a glass substrate 1 is formed the gate electrode 2 of tantalum (Ta) with a thickness of 2500 Å, and on the gate electrode 2 is formed an anodic oxidization film of tantalum oxide ($Ta_2O_5$) with a thickness of 3000 Å. A gate insulating film 4 with a thickness of 300 Å made of silicon nitride (SiNx) is coated on the entire surface of anodic oxidization film 3.

On a gate insulating film 4 above the gate electrode 2 is formed a semiconductor layer 5 with a thickness of 1000 Å of intrinsic semiconductor amorphous silicon (to be hereinafter referred to as a-Si (i)). On the semiconductor layer 5 are formed contact layers 6 having a thickness of 500 Å each of n-type semiconductor amorphous silicon (to be hereinafter referred to as a-Si (n+)). On the contact layers 6 are formed a source electrode 21a and a drain electrode 22a of titanium, the thickness of each of which is 3000 Å, resulting in TFT 11a.

On the gate insulating film 4 and drain electrode 22a is patterned the picture element electrode 8 with a thickness of 1000 Å of ITO. Furthermore, on the entire surface of the substrate are formed a protective coat 16 with a thickness of 3000 Å of SiNx and an orientation film 17.

An opposite substrate opposite to the active matrix substrate formed as above-mentioned is provided with a color filter 14 and a black stripe 15 on a glass substrate 12. On the entire surfaces of color filter 14 and black stripe 15 are an opposite electrode 13 and an orientation film 18 of ITO. Between the two orientation films 17 and 18 is charged a liquid crystal layer 19 so as to constitute an active matrix display apparatus.

With the above-mentioned construction, even when the picture element defects occur at one divided electrode, the picture element defects are inconspicuous because the other divided electrode continues to operate. However, on the picture element electrode at which no picture element defects occur, a gap 23 exists between the respective divided electrodes 20 and 21, and no voltage is applied to the liquid crystal layer 19 positioned between the gap 23 and the opposite electrode 13, so that the portion of the liquid crystal corresponding to the gap 23 does not contribute to the display. Accordingly, another problem is created as follows: A normally white mode liquid crystal apparatus, passes light through the gap 23 even when voltage is applied, so the contrast decreases. A normally black mode liquid crystal display apparatus does not pass light through the gap 23 even when voltage is applied, the whole display picture plane becomes dim. With the display apparatus using plasma or EL luminosity, the amount of emitting light per a unit area decreases which makes the whole display picture plane dim.

To solve the above-mentioned problem, an active matrix substrate as shown in FIGS. 27 and 29 can be proposed. FIG. 28 is a sectional view taken on the line C—C in FIG. 27, and FIG. 30 is a sectional view taken on the line E—E in FIG. 29. The display apparatus shown in FIGS. 27 and 29 are similar to that in FIG. 25, but different therefrom in that a superposed region 57 is provided at a region where divided electrodes 20 and 21 are adjacent to each other. These display apparatus, which are provided with the superposed regions 57 respectively, can contribute to a display even in the area positioned between the divided electrodes 20 and 21. In other words, since the divided electrodes 20 and 21 are superposed so as to sandwich a gate insulating film 28 therebetween in the superposed regions 57 shown in FIGS. 27 and 28 respectively, voltage can be applied to liquid crystal layers 41 positioned between the regions 57 and the opposite electrodes 39, respectively. The display apparatus shown in FIGS. 29 and 30 has divided electrodes 20 and 21, each of which forms a two-layer construction, and in each superposed region 57 are superposed the upper layer divided electrode 20b and the lower layer divided electrode 21a to each other. Accordingly, in the respective display apparatus, voltage can be applied to the liquid crystal layer 41 between the superposed region 57 and the opposite electrode 39, as well. The above-mentioned display apparatuses shown in FIGS. 27 and 29, in which the region that does not contribute to a display does not exist between the divided electrodes 20 and 21, do not cause the lowering of the contrast or brightness at the display picture plane.

However, even in these display apparatuses, once a TFT connected to the divided electrode malfunctions, deterioration of image quality caused by the occurrence of picture element defects cannot be avoided. To avoid the occurrence of such picture element defects, a correction technique using laser beams has been developed. For example, Japanese Laid-Open Patent Publication No. 59-101693 discloses that, when a TFT malfunctions, a laser beam is used to disconnect the defective TFT from the gate bus line and source bus line, so that the defective picture element electrode is connected to the adjacent picture element electrode, thereby restoring the TFT, the connection being carried out by irradiating a laser beam to a prepared restorable construction, which comprises an electrically conductive film provided across the two adjacent picture element electrodes. The electrically conductive film contacts one picture element electrode and is superposed on the other picture element electrode in a non-conductive state. A laser beam is irradiated so as to melt the picture element electrode and electrically conductive film superposed to each other in the non-conductive state, and to electrically connect between the picture element electrode and the electrically conductive film, thereby carrying out the restoration of TFT. Such a restoration will avoid the malfunction of TFT even though picture element defects arise, but the restored picture element electrode operates in the same way as that of the adjacent picture element electrode, and its inherent display operation cannot be performed.

Another construction for correcting picture element defects is disclosed in, for example, Japanese Laid-Open Patent Publication No. 61-153619, in which a plurality of switching elements are provided per one picture element electrode, and one of the switching elements is connected to the picture element electrode and the other is not connected thereto. When the switching element connected to the picture element electrode becomes defective, a laser trimmer, an ultrasonic cutter or the like is used to disconnect the defective switching element from the picture element electrode, and another switching element is connected thereto. The switching element is connected to the picture element electrode by bonding a minute conductor thereto by means of a dispenser or the like, or by coating Au, Al or the like onto a predetermined portion of the substrate. Moreover, Japanese Laid-Open Patent Publication No. 61-56382 discloses a construction in that a laser beam is irradiated onto the superposed portion of two metal layers, and the metal layers are melted so as to be electrically connected to each other.

The above-mentioned defect correction must be carried out on an active matrix substrate before the display apparatus is assembled. The reason for this is that, after completion of display apparatus, part of metal evaporated or melted by the laser beam irradiation enters into a display medium, such as liquid crystal, interposed between the picture element electrode and the opposite electrode, thereby remarkably deteriorating the optical characteristics of the display medium. Accordingly, the correction of picture element defects is always carried out at the active matrix substrate manufacturing process prior to the assembly of display apparatus, in other words, prior to the charge of display medium.

However, it is very difficult to detect picture element defects in the state of active matrix substrate. Especially, for a large-sized display apparatus consisting of picture elements of one hundred thousand to five hundred thousands or more, in order to find a defective switching element, by detecting the electrical characteristics of all the picture element electrodes, measuring instruments of extremely high accuracy must be used. Therefore, the detection process becomes complicated and mass-production becomes difficult, resulting in an expensive display apparatus. For the above-mentioned reasons, a large-sized display apparatus of large number of picture elements, in fact, cannot attain the correction of picture element defects in the state of substrate by the use of laser beams.

With the display apparatus for performing a high density display, the entire length of bus wirings connected to switching elements are extremely long. Therefore, a defective connection and/or a defective insulation is liable to occur in the bus wiring, which especially occur in the region where the bus wirings intersect with each other. The occurrence of such a defect is visibly recognized as a line defect starting from a picture element in the vicinity of the defective portion, the line defect remarkably deteriorating the image quality to create a serious problem in the manufacture of display apparatuses. Techniques to correct such a defect must be developed.

SUMMARY OF THE INVENTION

The active matrix substrate of this invention, which overcomes the above-discussed and numerous other disadvantages and deficiencies of the prior art, comprises picture element electrodes disposed in a matrix on an insulating substrate, each of said picture element electrode being composed of a plurality of divided electrodes, and an electrically conductive film on which a portion of each of the two of said divided electrodes that are adjacent to each other is superposed, wherein each of said portions of the two divided electrodes and said electrically conductive film are disposed so as to sandwich an insulating film therebetween in a non-conductive state, resulting in a connection.

In a preferred embodiment, a pair of metal pieces, respectively, are disposed between one of said portions of the two divided electrodes and said insulating film and between the other of said portions of the two divided electrodes and said insulating film at said connection. A hole is disposed in a portion of said insulating film positioned between one of said pair of metal pieces and said electrically conductive film.

The active matrix display apparatus of this invention comprises a pair of substrates at least one of which is translucent, a display medium which is charged between said pair of substrates, the optical characteristics of said display medium being modulated in response to an applied voltage, picture element electrodes disposed in a matrix on one of said substrate, each of said picture element electrode being composed of a plurality of divided electrodes, and an electrically conductive film on which a portion of each of the two of said divided electrodes that are adjacent to each other is superposed, wherein each of said portions of the two divided electrodes and said electrically conductive film are disposed so as to sandwich an insulating film therebetween in a non-conductive state, resulting in a connection, said connection being coated by a protective coat by which said connection is isolated from said display medium.

In a preferred embodiment, a pair of metal pieces, respectively, are disposed between one of said portions of the two divided electrodes and said insulating film and between the other of said portions of the two divided electrodes and said insulating film at said connection. A hole is disposed in a portion of said insulating film positioned between one of said pair of metal pieces and said electrically conductive film.

Alternatively, the active matrix display apparatus of this invention comprises picture element electrodes disposed in a matrix on one of said substrate, each of said picture element electrode being composed of a plurality of divided electrodes, and an electrically conductive film on which a portion of each of the two of said divided electrodes that are adjacent to each other is superposed, wherein said two picture element electrodes are superposed onto each other so as to sandwich an insulating film therebetween in a non-conductive state at the portion where said two divided electrodes are adjacent to each other, said electrically conductive film being electrically connected with one of said portions of the two divided electrodes and disposed to face the other portion of said two divided electrodes so as to sandwich said insulating film in a non-conductive state, resulting in a connection, said connection being coated by a protective coat by which said connection is isolated from said display medium.

Alternatively, the active matrix display apparatus of this invention comprises a pair of substrates at least one of which is translucent, a display medium charged between said pair of substrates, the optical characteristics of said display medium being modulated in response to an applied voltage, and picture element electrodes disposed in a matrix on the inner surface of one of said substrates, each of said picture element electrodes being composed of a plurality of divided electrodes, wherein each of said divided electrodes comprises an upper layer divided electrode and a lower layer divided electrode; at the portion where said two divided electrodes are disposed adjacent to each other, said lower layer divided electrode of one of said divided electrodes and said upper layer divided electrode of the other of said divided electrodes are superposed onto each other so as to sandwich an insulating film therebetween in a non-conductive state; an electrically conductive film is disposed so that it faces each of said upper layer divided electrodes at said two divided electrodes so as to sandwich said insulating film therebetween in a non-conductive state, resulting in a connection; and said connection is coated by a protective coat so as to be isolated from said display medium.

In a preferred embodiment, a pair of metal pieces are disposed at said connection between said two upper layer divided electrodes and said insulating film.

In a preferred embodiment, the lower layer divided electrode of one of said two adjacent divided electrodes and said electrically conductive film are previously electrically connected at said connection.

Alternatively, the active matrix display apparatus of this invention comprises a pair of substrates at least one of which is translucent, a display medium charged between said substrates, the optical characteristics of said display medium being modulated in response to an applied voltage, picture element electrodes disposed in a matrix on one of said pair of substrates, each of said picture element electrodes being composed of a pair of divided electrodes, a first bus wiring disposed between said pair of divided electrodes, and a second bus wiring intersecting with said first bus wiring, wherein a connection region comprises a pair of electrical conductor layers disposed at both sides of said first bus wiring and extending in parallel thereto, a pair of electrical conductor pieces superposed on portions of said electrical conductor layers so as to sandwich an insulating film therebetween in a non-conductive state, respectively, portions of said divided electrode superposed on said electrical conductor pieces in a conductive state respectively, and a spare wiring intersecting with said first bus wiring so as to sandwich said insulating film therebetween, said spare wiring being superposed on said electrical conductor layers so as to sandwich said insulating film therebetween in a non-conductive state, and said connection region being coated by a protective coat so as to be isolated from said display medium.

In a preferred embodiment, at the connection region, one end of each of said electrical conductor layer and each of said pair of branch ends of said second bus wiring are superposed to each other so as to sandwich said insulating film therebetween in a non-conductive state.

In a preferred embodiment, a connection comprises an electrically conductive film superposed on said divided electrodes constituting said picture element electrodes adjacent to each other, a pair of metal pieces superposed on both ends of said electrically conductive film so as to sandwich said insulating film therebetween in a non-conductive state, and portions of said divided electrodes superposed on said metal pieces in a conductive state, said connection being coated by a protective film so as to be isolated from said display medium.

Alternatively, the active matrix display apparatus of this invention comprises a pair of substrates at least one of which is translucent, a display medium charged between said substrates, the optical characteristics of said display medium being modulated in response to an applied voltage, picture element electrodes disposed in a matrix on one of said pair of substrates, each of said picture element electrodes being composed of a pair of divided electrodes, a first bus wiring disposed between said pair of divided electrodes, and a second bus wiring intersecting with said first bus wiring, wherein a connection region comprises a pair of electrical conductor layers disposed at both sides of said first bus wiring and extending in parallel thereto, a pair of branch ends of said second bus wiring superposed on one ends of said electrical conductor layers so as to sandwich an insulating film therebetween in a non-conductive state respectively, and a spare wiring intersecting with said first bus wiring so as to sandwich said insulating film therebetween, said spare wiring being superposed on said electrical conductor layers so as to sandwich said insulating film therebetween in a non-conductive state, and said connection region being coated by a protective coat so as to be isolated from said display medium.

In a preferred embodiment, a connection comprises an electrically conductive film superposed on said divided electrodes constituting said picture element electrodes adjacent to each other, a pair of metal pieces superposed on both ends of said electrically conductive film so as to sandwich said insulating film therebetween in a non-conductive state, and portions of said divided electrodes superposed on said metal pieces in a conductive state, said connection being coated by a protective film so as to be isolated from said display medium.

Alternatively, the active matrix display apparatus comprises a pair of substrates at least one of which is translucent, a display medium charged between said substrates, the optical characteristics of said display medium being modulated in response to an applied voltage, picture element electrodes disposed in a matrix on one of said pair of substrates, each of said picture element electrodes being composed of a pair of divided electrodes, and first bus wiring disposed between said pair of divided electrodes, wherein a connection comprises an electrically conductive film superposed on said two divided electrodes constituting each of said picture element electrodes adjacent to each other, a pair of metal pieces superposed on both ends of said electrically conductive film so as to sandwich an insulating film therebetween in a non-conductive state, and portions of said divided electrodes superposed on said metal pieces in a conductive state respectively, said connection being covered by a protective film so as to be isolated from said display medium.

In a preferred embodiment, a connection comprises an electrically conductive film superposed on said divided electrodes constituting said picture element electrodes adjacent to each other, a pair of metal pieces superposed on both ends of said electrically conductive film so as to sandwich said insulating film therebetween in a non-conductive state, and portions of said divided electrodes superposed on said metal pieces in a conductive state, said connection being coated by a protective film so as to be isolated from said display medium.

In a case that a defect which causes a picture element defect, occurs in any of the switching elements of a substrate having the above-mentioned structure, a divided electrode connecting with the defective switching element and another divided electrode adjacent to said divided electrode are electrically connected, so that a correction of the picture element defect can be performed. Such an electrical connection is performed by irradiating the connection laser beams. An electrically conductive film that constitutes the connection is superposed on the adjacent divided electrodes and is non-conductive to at least one of the divided electrodes, so that one divided electrode is normally electrically independent from the other. However, when one divided electrode does not operate, the electrically conductive film and the divided electrode that are in a non-conductive state are irradiated with laser beams so as to be electrically connected to each other. Hence, the non-operable divided electrode is electrically connected to the adjacent divided electrode, and can be driven by a switching element connected to the said adjacent divided electrode.

With the active matrix display apparatus having a connection region, a picture element defect is corrected by the use of this connection region. That is, the optical energy, such as laser beams, is radiated from the outside to superposed portions where the electrically conductive layer and electrically conductor piece are superposed onto each other and to superposed portions where the electrically conductive layer and spare wiring are superposed onto each other at both sides of the first bus wiring through the translucent substrate, respectively, thereby achieving a correction of picture element defects. At the above-mentioned four superposed portions irradiated with laser beams, an insulating film is broken, so that the electrically conductor piece and electrically conductive layer, as well as the electrically conductive layer and spare wiring at both sides of first bus wiring, respectively, are electrically connected to each other. Since the electrical conductor piece and divided electrode are superposed onto each other in a conductive state, the two divided electrodes adjacent to each other across the first bus wiring are electrically connected by the connection region. Accordingly, the divided electrode having a picture element defect is driven by means of the connection region and the switching element of the divided electrode adjacent to the said defective electrode across the first bus wiring.

In this way, a picture element defect is corrected by the use of the connection region or the connection. Thereafter, if necessary, a switching element connected to the divided electrode having a picture element defect can be disconnected from the divided electrode by irradiation with optical energy from the outside of the display apparatus.

The active matrix display apparatus of the invention can have a structure with a connection region by which a defective insulation created in the intersection region of bus wirings or a defective disconnection caused in the second bus wiring of the connection region is corrected. When a defective insulation arises, first of all, both side portions of the second bus wiring in the intersection region in which such a defect has occurred are cut by irradiation with laser beams. When a defective disconnection arises in the second bus wiring, the above-mentioned cutting is not required. Next, at both sides of the first bus wiring in the connection region, the laser beam is radiated from the outside through the translucent substrate onto superposed portions where the electrically conductive layer and a branch end branching off from the second bus wiring are superposed onto each other and the superposed portions where electrically conductive layer and a spare wiring are superposed onto each other. The insulating film is broken at each of the four superposed portions irradiated with laser beams, so that the electrically conductive layer and branch end, as well as the electrically conductive layer and spare wiring at both sides of the first bus wiring, are electrically connected to each other, respectively. In this way, both ends of the bus wirings that are in a non-conductive state at the portion of the intersection region, are electrically connected by the use of the connection region.

In the display apparatus of the invention, the connection region and connection are coated with a protective coat, respectively, so that even when the aforesaid correction by a laser beam irradiation from the outside of the display apparatus is carried out, molten metal or the like does not enter into the display medium, so that characteristics of display medium do not deteriorate. That is, the aforesaid correction by a laser beam irradiation is carried out between the protective coat isolated from the display medium and the substrate, and accordingly the correction can be performed affecting the display medium.

Thus, the invention described herein makes possible the objectives of (1) providing an active matrix substrate which, even when a picture element defect occurs due to defects of switching elements, can be restored without lowering the image quality of an active matrix display apparatus using the substrate therein; (2) providing an active matrix display apparatus in which a picture element defect can be corrected without lowering the image quality in the state that the display apparatus has been assembled; (3) providing an active matrix display apparatus in which even when a picture element defect occurs, the picture element is optically detected from the outside of the display apparatus and then corrected without deteriorating the image quality and lowering the contrast and brightness of the display picture plane; and (4) providing an active matrix display apparatus in which when a defective disconnection or a defective insulation occurs in an intersection region of bus wirings, such a defect can be easily corrected while the display apparatus is performing a display.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
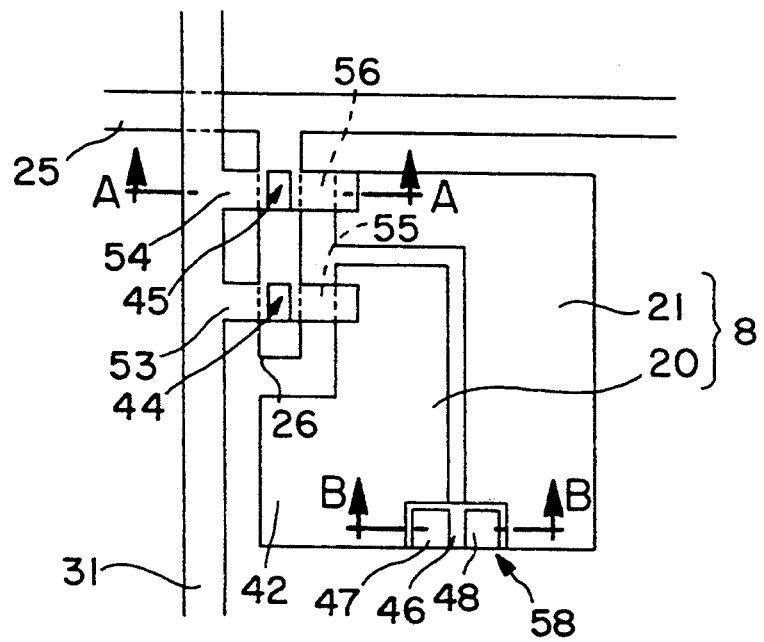
FIG. 1 is a plan view showing an active matrix substrate of this invention.
Figure 2:
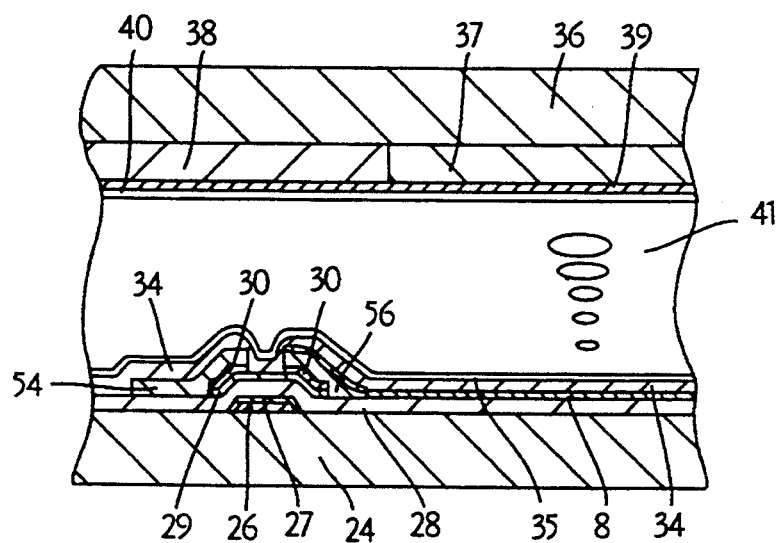
FIG. 2 is a sectional view showing an active matrix display apparatus with the substrate of FIG. 1, the view being taken along the line A—A of FIG. 1.

FIG. 1 shows an active matrix substrate of the present invention, in which gate bus lines 25 serving as scanning lines and source bus lines 31 serving as signal lines are provided in a grid-like form and at an intersection of each gate bus line 25 and source bus line 31 is interposed a gate insulating film 28 (FIG. 2). Two TFTs 44 and 45 are disposed on a gate electrode 26 extending from the gate bus line 25, and source electrodes 53 and 54 extending from the source bus line 31 are connected to the TFTs 44 and 45 respectively. A picture element electrode 8 is divided into two divided electrodes 20 and 21, which are connected to the TFTs 44 and 45 by means of drain electrodes 55 and 56 respectively, a connection 58 being provided at the portions of divided electrodes 20 and 21, which are the closest to each other but far from the TFTs 44 and 45.

FIG. 2 is a sectional view of a display apparatus using the active matrix substrate in FIG. 1, taken on the line A—A in FIG. 1, in which a gate electrode 26 with a thickness of 2500 Å made of Ta is provided on a glass substrate 24, on which an anode oxide film 27 of 3000 Å in thickness and a gate insulating film 28 of SiNx film are disposed. The gate insulating film 28 is applicable from 2000 to 10000 Å in thickness, but is 3000 Å in the present example. On the gate insulating film 28 is disposed an a-Si (i) film 29 of 1000 Å in thickness, and an a-Si (n+) films 30 of 500 Å in thickness is disposed thereon. The source electrode 54 and drain electrode 56 are made of Ti to be of 3000 Å in thickness. The picture element electrode 8 is made of ITO to be of 1000 Å in thickness. Moreover, a protective coat 34 and an orientation film 35 of SiNx are disposed on the entire surface of picture element electrode 8, the protective coat 34 being set to be of 3000 Å in thickness.

A glass substrate 36 is provided opposite to the active matrix substrate manufactured as mentioned above. The glass substrate 36 is provided with a color filter 37, a black stripe 38, and an opposite electrode 39 made of ITO. An orientation film 40 is disposed on the opposite electrode 39, and a liquid crystal layer 41 is charged between the two orientation films 35 and 40.

Figure 3:
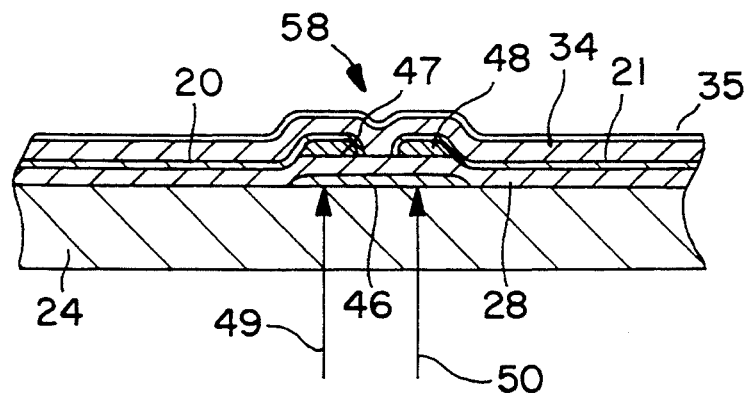
FIG. 3 is a sectional view showing a connection of the substrate of FIG. 1, the view being taken along the line B—B of FIG. 1.

FIG. 3 is a sectional view of the connection 58, taken on the line B—B in FIG. 1. In FIG. 3, on the glass substrate 24 is disposed an electrically conductive film 46 made of Ta. The electrically conductive film 46 can be patterned simultaneously with the formation of the gate bus line 25 and gate electrode 26, and the gate insulating film 28 is disposed on the electrically conductive film 46. Although the gate insulating film 28 as an insulating film for the connection 58 is applicable in the range of 1000 Å to 7000 Å in thickness, because the film 28 of this example serves as a gate insulating film, the thickness thereof is set to be 3000 Å as mentioned above. On the gate insulating film 28 are disposed two metal pieces 47 and 48, on which portions of divided electrodes 20 and 21 are superposed, and the aforesaid protective coat 34 and orientation film 35 are disposed thereon in that order. The thickness of the protective coat 34 in the connection 58 is suitable to be in the range of about 1500 to 15000 Å. As mentioned above, it is set at 3000 Å, in the present example.

The active matrix substrate having such a connection 58 is used to assemble a liquid crystal display apparatus. Next, a gate-on signal is applied to all the gate bus lines 25 and drive voltage is applied from all the source bus lines 31 to all the picture element electrodes through all the TFTs, whereby the entire display picture plane is put in a display state. In this way, in the active matrix display apparatus of this example, the position of picture element defects can be easily visually specified in the state that the apparatus actually operates, and thereafter the picture element defects are corrected.

In a case where a picture element defect caused by one of the two TFTs 44 and 45 is found, the defect is corrected as follows: A laser beam is irradiated from the glass substrate 24 side onto two portions at the connection 58 shown by the arrows 49 and 50 in FIG. 3. When the laser beam is irradiated, the gate insulating film 28 is broken at the position indicated by the arrow 49, so that the electrically conductive film 46 and metal piece 47 are melted so as to be electrically connected with each other. In the same way as mentioned above, at the position of the arrow 50, the electrically conductive film 46 and metal piece 48 are electrically connected therebetween. Melting of electrically conductive film 46 and metal pieces 47 and 48 by the use of a laser beam is carried out between the protective coat 34 and the glass substrate 24, so that there is no fear that the liquid crystal layer 41 is contaminated with molten metal or the like. The protective coat 34 is transparent so that the laser beam can be transmitted therethrough. Hence, the laser beam is absorbed to the electrically conductive film 46 of metal and metal pieces 47 and 48, thereby instantaneously melting these members, so that there is no fear that the laser beam is irradiated to damage the protective coat 34. Thus, the two divided electrodes 20 and 21 are electrically connected to each other. When the picture element defect is not corrected in this condition, the defective TFT is further disconnected from the divided electrode or the source bus line 31. In this way, the picture element electrode 8 composed of the two divided electrodes 20 and 21 is driven by one TFT, thereby enabling operation as an inherent picture element electrode.

Figure 4:
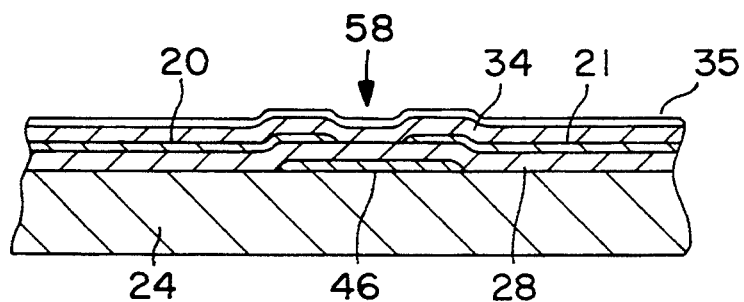
FIGS. 4 and 5, respectively, are sectional views showing other connections of the substrate of this invention.

FIG. 4 shows another example of the connection 58, in which an electrically conductive film 46 and a gate insulating film 28 are disposed on a glass substrate 24 in the same way as the example in FIG. 3. The connection in this example has no metal piece, and divided electrodes 20 and 21 are directly formed on the gate insulating film 28, and a protective coat 34 and an orientation film 35 are disposed on the divided electrodes 20 and 21. At the connection in this example, the electrically conductive film 46 and divided electrodes 20 and 21 are directly electrically connected to each other.

Figure 5:
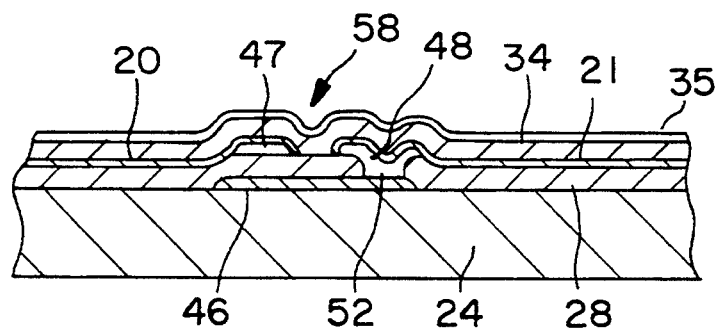

FIG. 5 shows still another example of the connection 58, in which a portion of the connection 58 at the divided electrode 20 side is similar in construction to that in FIG. 3. However, at the divided electrode 21 side, a through hole 52 is provided in the gate insulating film 28 positioned between the electrically conductive film 46 and the metal piece 48, the electrically conductive film 46 and metal piece 48 being electrically pre-connected to each other. Such a construction can electrically connect the divided electrodes 20 and 21 by one time irradiating a laser beam thereonto.

Since the active matrix substrate at this example has a construction that picture element defects can be easily restored, the production yield is improved. Moreover, in the active matrix display apparatus of the invention, picture element defects can be visually detected after the display apparatus has been manufactured, and the picture element defects are directly corrected as the display apparatus stands. Therefore, an inspection process and a restoration process for the display apparatus are simplified, and the display apparatus can be mass-produced, which makes the production cost low.

EXAMPLE 2

Figure 6:
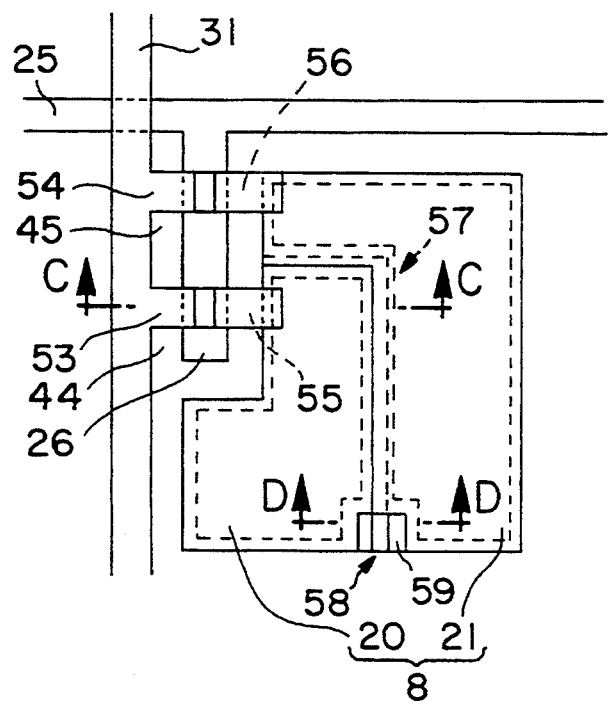
FIG. 6 is a plan view showing an active matrix substrate that constitutes another display apparatus of this invention.

FIG. 6 is a plan view of an active matrix substrate used for another display apparatus of the invention, which is similar to that of Example 1, but has a superposed region 57 where divided electrodes 20 and 21 are superposed in part. This example is different from Example 1 in that the divided electrode 20 with a thickness of 1000 Å is made of $SnO_2$ and the divided electrode with a thickness of 1000 Å 21 is made of ITO. TFTs 44 and 45 in this example are similar in construction to those of Example 1.

Figure 28:
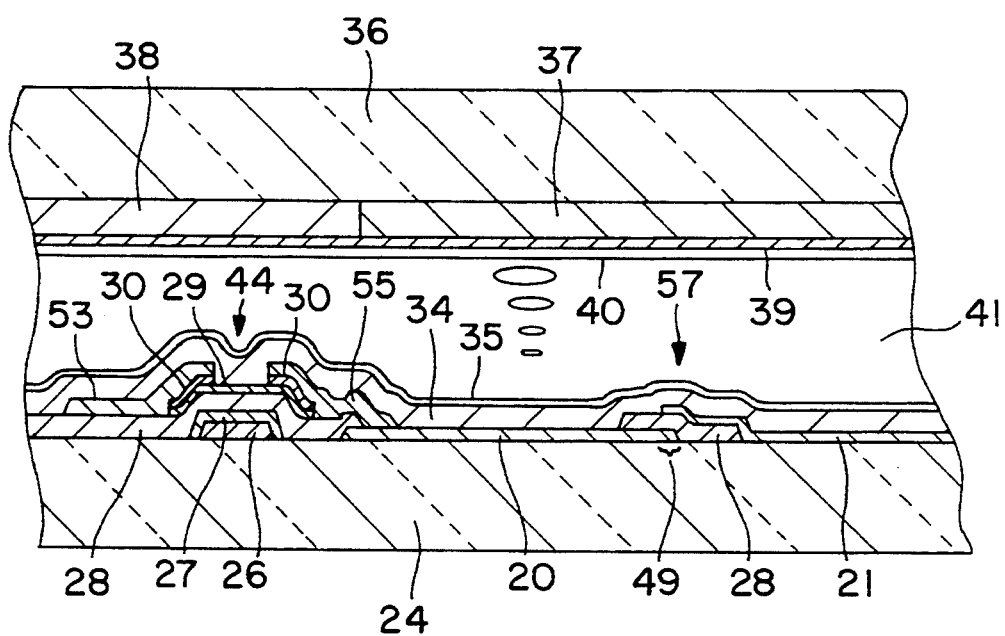
FIG. 28 is a sectional view showing a display apparatus with the substrate of FIGS. 6 and 27, the view being taken along the lines C—C of FIGS. 6 and 27.
Figure 29:
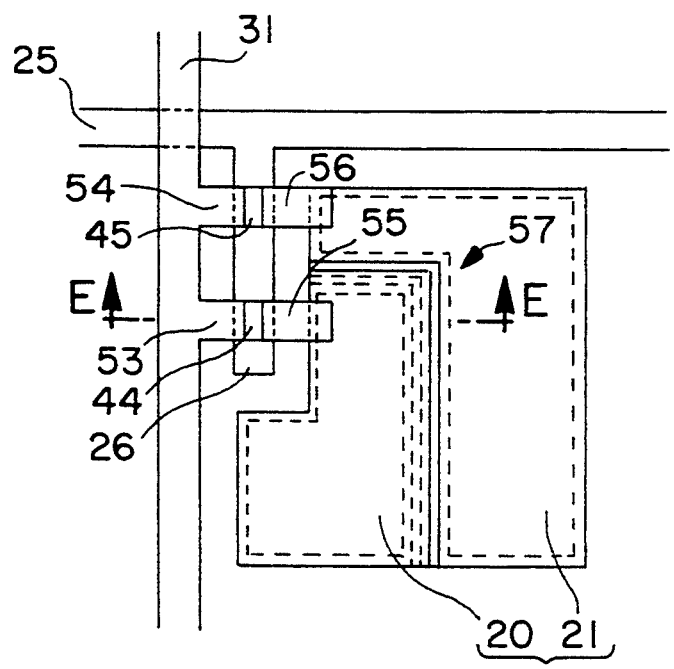
FIG. 29 is a plan view showing still another conventional active matrix substrate.

FIG. 28 also is a sectional view taken on the line C—C in FIG. 6. The sectional construction of the superposed region 57 will be described with reference to FIG. 28. The divided electrode 20 is disposed on a glass substrate 24 and the divided electrode 21 is disposed on the glass substrate 24 at the lateral side of the divided electrode 20. At the region where the divided electrodes 20 and 21 are disposed, as shown by the dashed line in FIG. 6, a gate insulating film 28 at the inward portion from the entire peripheral edge of the divided electrodes 20 and 21 is removed therefrom. In the superposed region 57 where the divided electrodes 20 and 21 are adjacent to each other, the gate insulating film 28 is disposed across the lower surface of the divided electrode 21 and the upper surface of the divided electrode 20. That is, the gate insulating film 28 is positioned within a superposed portion 49 that is formed by the divided electrodes 20 and 21.

In the superposed region 57 of the present example, the divided electrode 21 is superposed on the divided electrode 20 so as to sandwich the gate insulating film 28 therebetween, but the divided electrodes 20 and 21 may be superposed vice versa to the above-mentioned.

Figure 7:
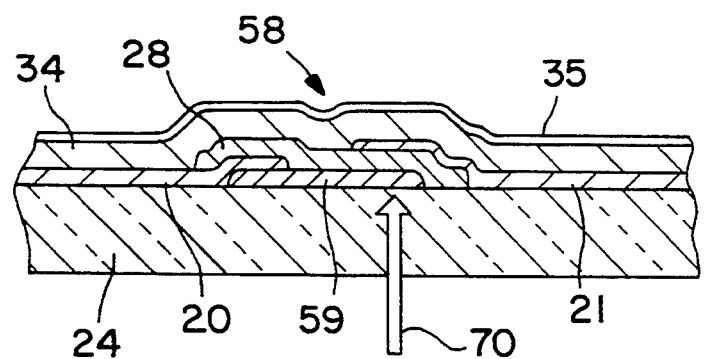
FIG. 7 is a sectional view taken along the line D—D of FIG. 6.

As shown in FIG. 6, a connection 58 is disposed at the ends of the adjacent divided electrode 20 and 21. FIG. 7 is a sectional view of the connection 58 taken on the line D—D in FIG. 6, in which an electrically conductive film 59 with a thickness of 2500 Å of Ta is disposed on the glass substrate 24. In this example, the film 59 is formed simultaneously with gate bus lines 25 and gate electrodes 26, the divided electrode 20 being superposed on one end of film 59, and the gate insulating film 28 is not removed but covers the electrically conductive film 59, so that the electrically divided electrode 21 is superposed onto the end of conductive film 59, on which the divided electrode 20 is not superposed, so as to sandwich the gate insulating film 28 therebetween.

A protective coat 34 of SiNx is disposed on the entire surface of the substrate on which the TFT 44, divided electrodes 20 and 21, superposed portion 57 and connection 58 and the like have been disposed in the above-mentioned way. The protective coat 34 has a thickness that is preferable in the range of 1500 to 15000 Å on the connection 58. It is set at 3000 Å in the present example. Furthermore, an orientation film 35 is disposed on the protective coat 34, resulting in an active matrix substrate.

An opposite substrate opposite to the active matrix substrate constructed in this way, as shown in FIG. 28, is so constructed that a color filter 37 and a black stripe 38 are formed on a glass substrate 36. An opposite electrode 39 of ITO is further formed on the entire surface of the opposite substrate. An orientation film 40 is formed on the opposite electrode 39 and a liquid crystal layer 41 is charged between the orientation films 35 and 40, resulting in an active matrix display apparatus of the invention.

In the present example, in order to detect a divided electrode causing a picture element defect, for example, an ac pulse is applied simultaneously to all the picture elements through the TFTs, and changes in the contrast of the picture elements are easily observed. Since the contrast is abnormally changed in the defective picture element, the defective picture element is optically easily observed. The picture element defect is corrected by the use of the connection 58. The correction of the defective picture element is carried out by irradiating the position shown by the arrows 70 in FIG. 7 with energy such as a laser beam. The irradiation with laser beam brings about a breakage of the gate insulating film 28, and the electrically conductive film 59 and divided electrode 21 are electrically connected to each other, whereby the divided electrodes 20 and 21 are connected by means of the electrically conductive film 59. Furthermore, in a case where the picture element defect occurs due to a defective insulation of TFT, the defective TFT is disconnected from the divided electrode by irradiation with a laser beam, the divided electrode causing the picture element defect being driven by the TFT of the adjacent divided electrode so that the picture element defect is corrected.

In the present example, the superposed region 57 is formed at the region where the two divided electrodes 20 and 21 are adjacent to each other, and voltage is applied also to the liquid crystal layer 41 positioned between the region 57 and the opposite electrode 39. Therefore, the display area of the entire picture element is not reduced and the contrast and brightness of the display picture plane are not lowered.

EXAMPLE 3

Figure 8:
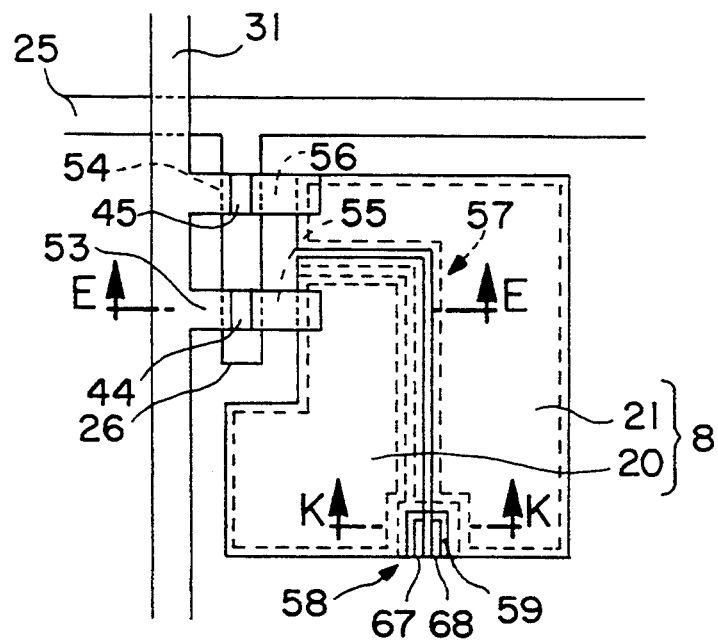
FIG. 8 is a plan view showing an active matrix substrate that constitutes another display apparatus of this invention.

FIG. 8 is a plan view of another active matrix substrate used for a display apparatus of the invention, in which a picture element electrode 8 is divided into two divided electrodes 20 and 21, which are connected to TFTs 44 and 45 by means of drain electrodes 55 and 56 respectively. Source electrodes 53 and 54 of the TFTs 44 and 45 are connected to the same source bus line 31, and a gate electrode 26 common to the TFTs 44 and 45 is connected to a gate bus line 25. Accordingly, the divided electrodes 20 and 21 are driven by the same gate bus line 25 and the same source bus line 31. In the region adjacent to the divided electrode 20 and 21 is provided a superposed region 57.

Figure 30:
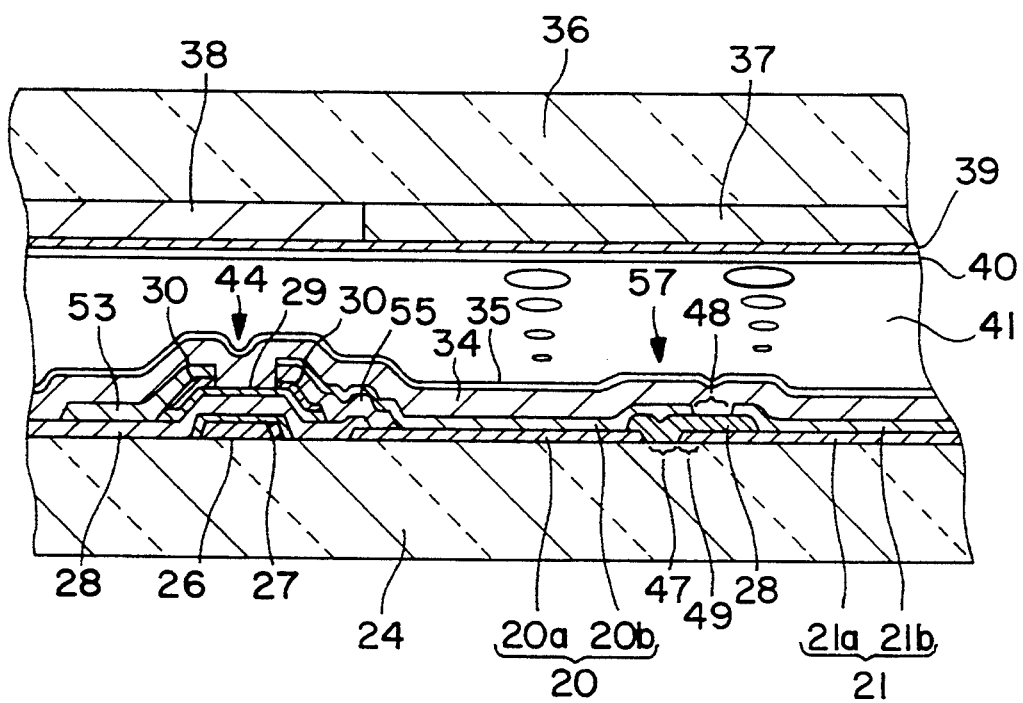
FIG. 30 is a sectional view showing a display apparatus with the substrate of FIGS. 8 and 29, the view being taken along the lines E—E of FIGS. 8 and 29.

A sectional view of the display apparatus using the above substrate, taken on the line E—E in FIG. 8 is the same as FIG. 30. The sectional construction of the TFTs 44 and 45 of the present example is the same as that of the TFT 44 described in FIG. 28. The constructions in section of the picture element electrode 8 and superposed region 57 are described with reference to FIG. 30. In this example, the divided electrode 20 is a double-layered structure composed of a lower divided electrode 20a and an upper layer divided electrode 20b. The divided electrode 21 is likewise a double-layered structure composed of a lower layer divided electrode 21a and an upper layer divided electrode 21b. On the glass substrate 24 are disposed the lower layer divided electrodes 20a and 21a made of ITO, the thickness of each of which is 500 to 700 Å, the lower layer divided electrodes 20a and 21a being provided across a gap 47. In the region where the lower layer divided electrodes 20a and 21a are disposed, as shown by the dashed line in FIG. 8, a gate insulating film 28 is removed at the portion thereof inside the peripheral edge of each of the electrodes 20a and 21a. In the superposed region 57 adjacent to the lower layer divided electrodes 20a and 21a, the gate insulating film 28 remains across them.

As shown in FIG. 30, on the lower layer divided electrodes 20a and 21a are disposed the upper layer divided electrodes 20b and 21b of ITO to be of 500 to 700 Å in thickness respectively, the upper layer divided electrode 20b being also disposed on the drain electrode 55 of TFT 44 in order to ensure contact with the drain electrode 55. The upper layer divided electrodes 20b and 21b are disposed on the gate insulating films 28 and spaced from each other at a gap 48 in the superposed region 57, the gap 48 being provided so that it is not superposed on the gap 47 between the lower layer divided electrodes 20a and 21a. In other words, the upper layer divided electrode 20b is positioned above the gap 47, and the lower layer divided electrode 21a is positioned below the gap 48. The upper layer divided electrode 20b is superposed on the lower layer divided electrode 21a so as to sandwich the gate insulating film 28 therebetween, resulting in a superposed portion 49.

In the superposed portion 49 of the present example, the upper layer divided electrode 20b is superposed on the lower layer divided electrode 21a. Alternatively, the upper layer divided electrode 21b may be superposed on the lower layer divided electrode 20a. In this case, the upper layer divided electrode 21b is positioned above the gap 47 and the lower layer divided electrode 20a is positioned below the gap 48.

Figure 9:
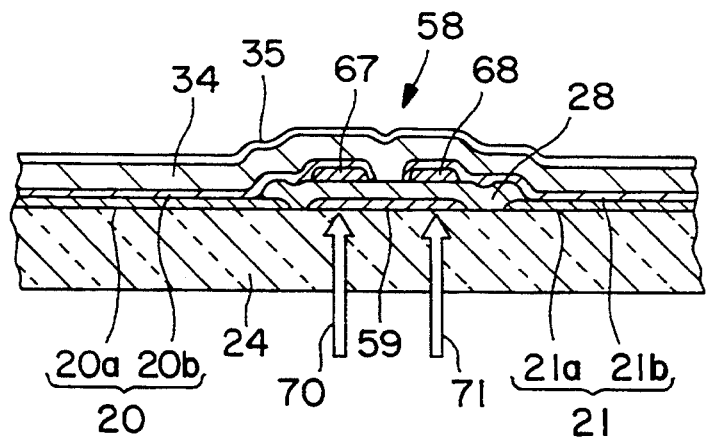
FIG. 9 is a sectional view showing a connection of the substrate of FIG. 8, the view being taken along the line K—K of FIG. 8.

A connection 58 is formed at the end of a region where the divided electrodes 20 and 21 are adjacent to each other. FIG. 9 is a sectional view of the connection 58 taken on the line K—K in FIG. 8, in which an electrically conductive film 59 of Ta to be of 2500 Å in thickness is disposed on a glass substrate 24. The electrically conductive film 59 in this example is formed simultaneously with the gate bus line 25 and gate electrode 26 and between the lower layer divided electrodes 20a and 21a. Metal pieces 67 and 68 are provided above both ends of the electrically conductive film 59 and sandwich the gate insulating film 28 between the metal pieces 67 and 68 and the film 59, the upper layer divided electrodes 20b and 21b being superposed on the metal pieces 67 and 68, respectively.

A protective coat 34 of SiNx to be of 3000 Å in thickness is disposed on the entire surface of the substrate on which the TFT 44, divided electrodes 20 and 21, superposed portion 57 and connection 58 have been disposed as mentioned above. Moreover, an orientation film 35 is disposed on the protective coat 34, resulting in an active matrix substrate.

An opposite substrate opposite to the active matrix substrate formed in this way, is the same as that shown in FIG. 28, in which a liquid crystal layer 41 is charged between the two orientation films 35 and 40, resulting in an active matrix display apparatus of this example.

Also, in the present example, when the picture element defect occurs at one divided electrode, the defect is corrected by the use of the connection 58. The correction of the defective picture element is performed by irradiating the positions shown by the arrows 70 and 71 in FIG. 9 with energy such as a laser beam. The irradiation with a laser beam causes a breakage of the gate insulating film 28 so that the upper layer divided electrodes 20b and 21b are electrically connected to each other. Hence, the divided electrodes 20 and 21 are electrically connected by means of the electrically conductive film 59. Furthermore, in a case where the picture element defect is caused by a defective insulation of TFT or the like, the defective TFT is disconnected from the divided electrode by irradiation with a laser beam. Thus, the divided electrode having a defective picture element is driven by a TFT connected to the adjacent divided electrode.

In the present example, the superposed region 57 is formed in the region adjacent to two divided electrodes 20 and 21. Since either one of the upper layer divided electrode 20b and the lower layer divided electrode 20a exists at any portion of the superposed region 57, voltage is applied to a liquid crystal positioned between the region 57 and the opposite electrode 39. Hence, a display area of the entire picture element is not reduced and the contrast and brightness of display picture plane are not lowered.

Figure 10:
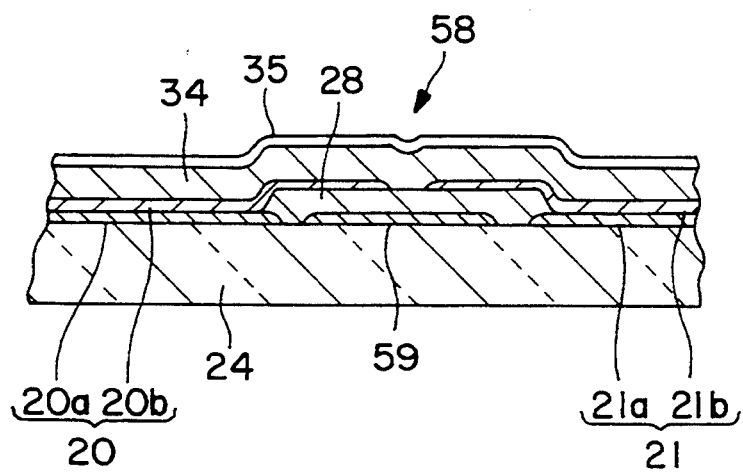
FIGS. 10 and 11, respectively, are sectional views showing other connections of the substrate of this invention.
Figure 11:
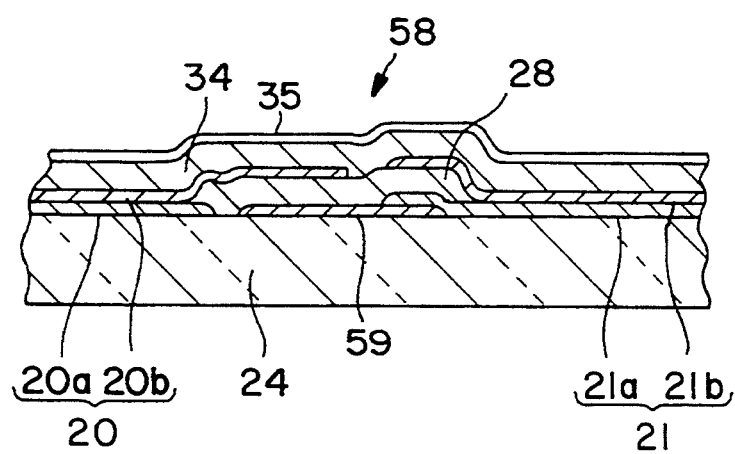

FIGS. 10 and 11 show a connection 58 for still another example of the display apparatus of the invention. The connection 58 in FIG. 10 is not provided with the metal pieces 67 and 68, and an electrically conductive film 59 and upper layer divided electrodes 20b and 21b are directly electrically connected to each other by irradiation with a laser beam. The connection 58 in FIG. 11 is so constructed that the electrically conductive film 59 is electrically pre-connected to and a lower layer divided electrode 21a, the laser beam being irradiated to electrically connect the film 59 and an upper layer divided electrode 20b are electrically connected to each other by a laser beam irradiation process.

In the active matrix display apparatus of this example, even when a picture element defect occurs, the defective picture element can be detected from the outside of the display apparatus and thereafter it is restored without lowering the image quality. Moreover, since the contrast or brightness of the display picture plane is not lowered, a high image quality display apparatus is obtainable with a high production yield at a low production cost.

EXAMPLE 4

Figure 12:
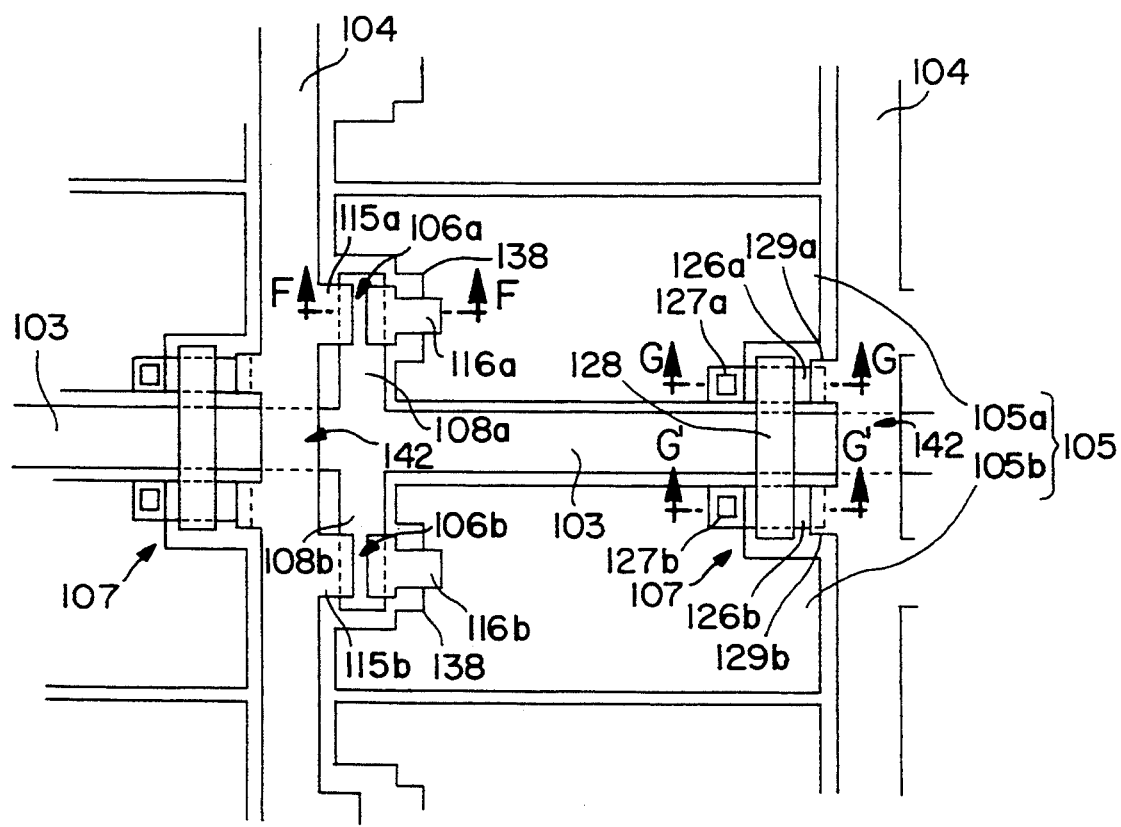
FIG. 12 is a plan view showing an active matrix substrate that is used in still another display apparatus of this invention.

FIG. 12 shows still another active matrix substrate used for a display apparatus of the invention, in which picture element electrodes 105 made of a transparent conductive film (ITO) are disposed in a matrix form and each electrode 105 is divided into a pair of divided electrodes 105a and 105b, between which a gate bus wiring 103 for supplying a scanning signal is disposed. Source bus wirings 104 each supplying a data signal are disposed perpendicularly to the gate bus wirings 103. Each gate bus wiring 103 is generally formed by a single layer or multi-layer of metal, such as Ta, Al, Ti or Mo, the present example using Ta. Each source bus wiring 104 is formed by the same metal as the above-mentioned, the present invention using Ti. In the intersection region 142 of the gate bus wiring 103 and source bus wiring 104, a gate insulating film 111 (FIG. 13) to be discussed below is interposed therebetween.

A gate bus branch 108a branches out from the gate bus wiring 103 in parallel to the source bus wiring 104 toward the divided electrode 105a, and a TFT 106a is disposed on the branch 108a. A gate bus branch 108b branches out from the same in parallel to the source bus wiring 104 toward the divided electrode 105b, as well, and a TFT 106b is disposed on the branch 108b. TFTs 106a are 106b are electrically connected to the same source bus wiring 104 by source electrodes 115a and 115b. The TFT 106a and divided electrode 105a are electrically connected by a drain electrode 116a, the TFT 106b and divided electrode 105b being electrically connected by a drain electrode 116b.

Figure 16:
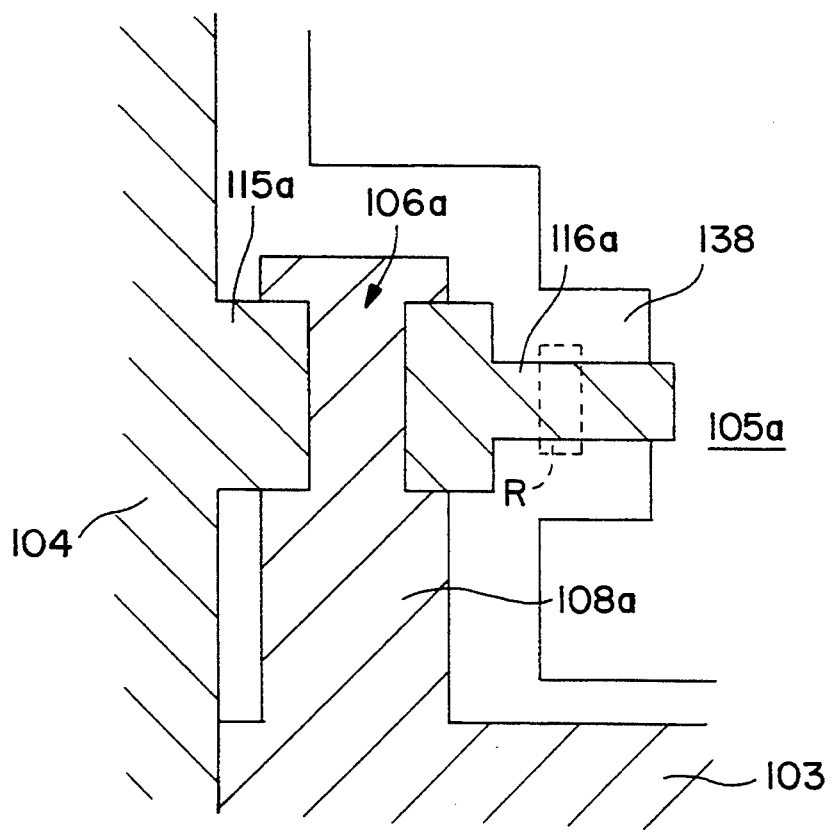
FIG. 16 is a plan view showing an enlarged portion in the vicinity of the TFT of FIG. 12.

FIG. 16 is a plan view in the vicinity of TFT 106a, in which a rectangular cutout 138 is provided in the divided electrode 105a to which the drain electrode 116a is connected, the drain electrode 116a being connected to the side of cutout 138 that is the farthest from the gate bus branch 108a.

With the above-mentioned construction, the pair of divided electrodes 105a and 105b are driven by the same scanning signal and the same data signal by means of the separate TFTs 106a and 106b. Accordingly, the two divided electrodes 105a and 105b constituting one picture element electrode 105 can carry out the same disaply at the same time.

Figure 13:
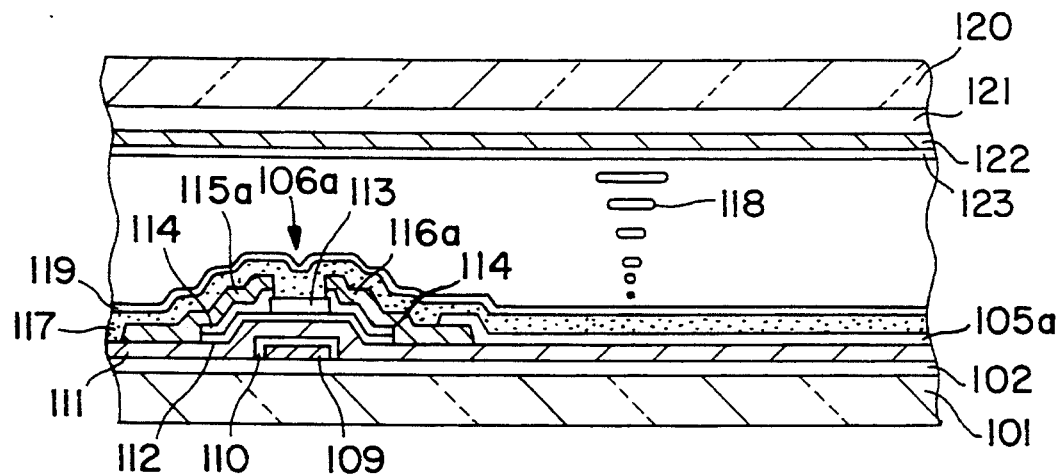
FIGS. 13 and 14 are sectional views showing a display apparatus with the active matrix substrate of FIG. 12, the views, respectively, corresponding to the views taken along the lines F—F and G—G of FIG. 12.

FIG. 13 is a sectional view taken on the line F—F in FIG. 12. The sectional construction in the vicinity of TFT 106a is described in accordance with FIG. 13. The sectional construction of the TFT 106b is the same as that of the TFT 106a. On a glass substrate 10 is disposed a base coat film 102 made of $Ta_2O_5$, $Al_2O_3$, or SiNx to be of 3000 to 9000 Å in thickness. On a gate electrode 109 of Ta formed as a portion fo the gate bus branch 108a, an anode oxidization film 110 of $Ta_2O_5$ obtained by anode-oxidizing the surface of the gate electrode 109 is disposed. A gate insulating film 111 of SiNx (for example, $Si_3N_4$) functioning as the gate insulating film is disposed on the entire surface of the substrate including th film 110. The thickness of the gate insulating film 111 is proper in the range of 500 to 6000 Å, but set at 2000 to 3500 Å in this example.

On the gate insulating film 111 are disposed an a-Si (i) film 112 and a semiconductor protective coat 113 made of SiNx for protecting the upper surface of the a-Si (i) film 112. Moreover, an a-Si (n+) film 114 is disposed on the protective coat 113. A source electrode 115a and a drain electrode 116a are disposed on the a-Si (n+) film 114, the a-Si (n+) film 114 being provided to obtain ohmic contact with the source electrode 115a and drain electrode 116a. The divided electrode 105a is patterned on the gate insulating film 111 and electrically connected to the drain electrode 116a.

A protective coat 117 is disposed, which is made of SiNx, so as to cover the entire surfaces of TFT 106a and picture element electrode 105. An orientation film 119 for regulating the orientation of the liquid crystal layer 118 is disposed on the protective coat 117. The suitable thickness of the protective coat 117 is in the range of 2000 to 10000 Å, but set at about 5000 Å in the present example. The gate insulating film 111 and protective coat 117 can be made of oxide, such as SiOx, $Ta_2O_5$ or $Al_2O_3$ or nitride other than SiNx. Moreover, the protective coat 117 can be of a window structure by which the coat 117 is not disposed on the entire surface of the substrate, but it covers only a portion, such as the bus wiring, which is not directly related to the display and a portion of the coat 117 is removed corresponding to the centers of the divided electrodes 105a and 105b.

On the inner surface of the other glass substrate 120 opposite to the glass substrate 101 are superposed a color filter 121, an opposite electrode 122, and an orientation film 123. A black matrix (not shown) is, as desired, provided around a portion of the color filter 121 opposite to the picture element electrode 105.

Between the pair of glass substrate 101 and 120 is charged a twisted nematic liquid crystal layer 118 as a display medium. The liquid crystal layer 118 responds to voltage applied between the picture element electrode 105 and the opposite electrode 122 so as to modulate the orientation thereof, thereby performing an optical modulation. Such an optical modulation is visually recognized as a display pattern.

As shown in FIG. 12, a connection region 107 is formed along the gate bus wiring 103 at the corners of the divided electrodes 105a and 105b where the TFTs 106a and 106b are not disposed. The connection region 107 is disposed across the two corners.

Figure 14:
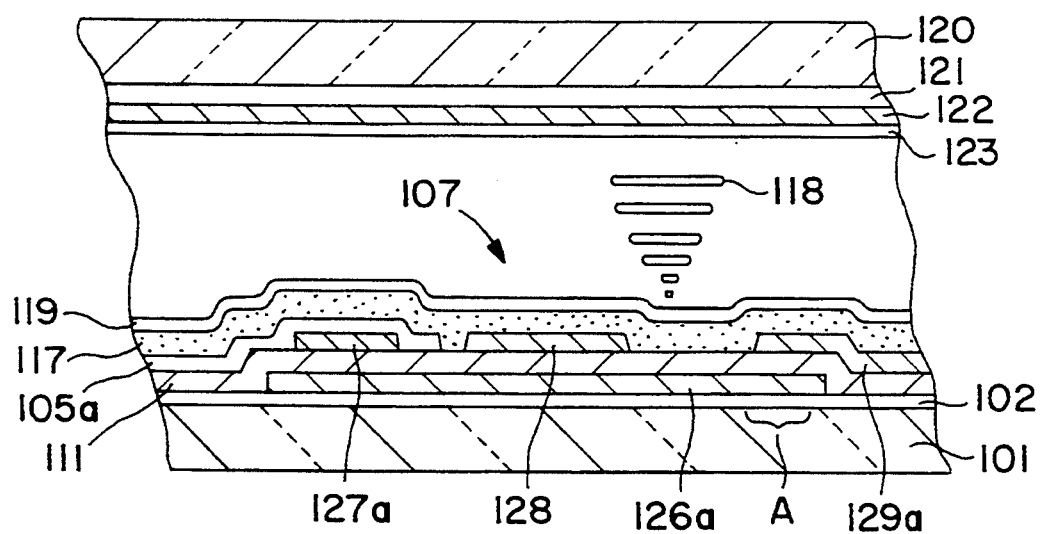

FIG. 14 is a sectional view taken on the line G—G in FIG. 12, and a sectional view taken on the line G'—G' in FIG. 12 is the same as FIG. 14, as well. A pair of conductor layers 126a and 126b disposed in a parallel manner at both sides of the gate bus wiring 103 are disposed on a base coat film 102. The conductor layers 126a and 126b can be formed simultaneously with the gate bus wiring 103. The above-mentioned gate insulating film 111 is disposed on the entire surfaces of the conductor layers 126a and 126b, and conductor pieces 127a and 127b are disposed to sandwich therebetween the gate insulating film 111 above the one ends of the conductor layers 126a and 126b, respectively. The divided electrodes 105a and 105b are disposed on the conductor pieces 127a and 127b, respectively, and electrically connected to each other.

Spare wiring 128 is disposed on the centers of the conductor layers 126a and 126b. The spare wiring 128, as shown in FIG. 12, is disposed above the conductor layer 126a, gate bus wiring 103, and conductor layer 126b so as to sandwich the insulating film 111 therebetween. The conductor pieces 127a and 127b and spare wiring 128 can be formed simultaneously with the source bus wiring 104.

Above the other ends of the conductor layers 126a and 126b, branch ends 129a and 129b of thke source bus wiring 104 are disposed to sandwich the gate insulating film 111 therebetween. The conductor layers 126a and 126b, conductor pieces 127a and 127b and spare wiring 128 are made of Ta, Al, Ti, Mo, or the like.

In the connection region 107 with the above-mentioned construction, the conductor piece 127a, spare wiring 128, and branch end 129a are disposed in that order above the conductor layer 126a so as to sandwich the gate insulating film 111 therebetween in such a way that they are electrically disconnected to each other. The conductor piece 127b, spare wiring 128, and branch end 129b also are disposed in that order above the conductor layer 126b so as to sandwich the gate insulating film 111 therebetween in such a way that they are electrically disconnected to each other. The spare wiring 128 is disposed above the two conductor layers 126a and 126b, which have been disposed at both sides of the gate bus wiring 103, so as to sandwich thke gate insulating film 111 therebetween. The connection region 107 is completely coated by the protective coat 117.

The gate insulating film 111 interposed between the conductor layer 126a, and the conductor piece 127a, spare wiring 128 and branch end 129a functions as an interlayer insulating film positioned therebetween and is suitable to be in the range of 1000 to 7000 Å in thickness, but since the present example utilizes the gate insulating film 111 of TFT 106a, the film 111 is set to be of 2000 to 3500 Å as mentioned above.

The protective coat 117 serves to electrically connect between the conductor layer 126a and the conductor piece 127a, spare wiring 128 and branch end 129a in the state of isolating from the liquid crystal layer 118 of a display medium. The thickness of the protective coat 117 is applicable in the range of 1500 to 15000 Å. Since the protective coat for the TFT 106a is utilized in the present example, it is set to be about 5000 Å.

Drive voltage is applied from all the wirings of gate bus wiring 103 and source bus wiring 104 of the liquid crystal display apparatus having the above-mentioned construction to all the divided electrodes 105a and 105b through TFTs 106a and 106b, and the entire surface of the display picture plane is put in a display state. Thus, the picture element defect is visually recognized with ease. In a case that a picture element defect occurs in the divided electrode 105a or 105b due to a defect of TFT 106a or 106b, or a defective connection of the gate branch 108a or 108b, it is easy to correct the defect by the use of the connection region 107.

Figure 15:
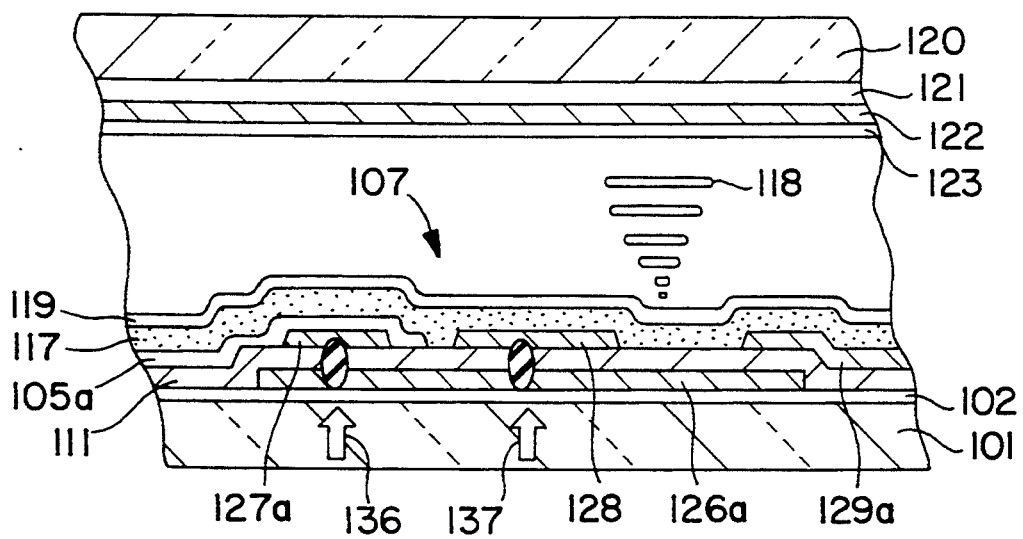
FIG. 15 is a sectional view showing a connection region that is used for a correction of picture element defects.

An example will be quoted, in which a defect occurs in the TFT 106a or gate branch 108a so that a picture element defect occurs in the divided electrode 105a. The picture element defect is corrected by irradiation with a laser beam from the outside of the display apparatus. FIG. 15 is a sectional view taken on the line G—G in FIG. 12. As shown by the arrows 136 and 137, the connection region 107 is irradiated with energy, such as laser beams, infrared rays or electron beams, from the outside through the lower glass substrate 101. In the present example, a YAG laser beam is used as the irradiation energy. In the superposed portion (shown by the arrow 136) where the conductor layer 126a, the gate insulating film 111 and conductor piece 127a are superposed and irradiated with a laser beam, the gate insulating film 111 causes a breakdown and the conductor layer 126a and conductor piece 127a are fused to connect with each other and become conductive. In the same way as the above-mentioned, the superposed portion (indicated by the arrow 137) of the conductor layer 126a, gate insulating film 111 and spare wiring 128, is irradiated with a laser beam, which causes a breakdown in the gate insulating film 111, and the conductor layer 126a and spare wiring 128 are fused and connected with each other so as to be conductive. Since the conductor piece 127a and divided electrode 105a are in a conductive state, the divided electrode 105a and spare wiring 128 are electrically connected.

By irradiation with a laser beam, likewise, an electrical connection is carried out between the conductor layer 126b and the conductor piece 127b and between the conductor layer 126b and the spare wiring 128. The conductor piece 127b and divided electrode 105b are now in a conductive state, and the divided electrode 105b and spare wiring 128 are electrically connected. In this way, four portions are connected respectively, so that the divided electrodes 105a and 105b are electrically connected. Accordingly, the divided electrode 105a having a picture element defect is driven by a normal TFT 106b by means of the connection region 107.

In the case that a picture element defect occurs in the divided electrode 105a due to a defective insulation of TFT 106a or a defective insulation occurs in the gate branch 108a, a drain electrode 116a of the TFT 106a is cut by a laser beam irradiation. As shown in FIG. 16, a cutout 138 is provided in the divided electrode 105a to be connected to the drain electrode 116a. The drain electrode 116a is cut by irradiating a region R in the cutout 138 with the laser beam. Such a cutout 138 prevents molten electrode material, when the drain electrode 116a is cut from again attaching to a portion positioned between the drain electrode 116a and the divided electrode 105a so as to become electrically conductive therebetween.

Moreover, even when a defect occurs in the TFT 106b or the gate branch 108a so as to cause a picture element defect in the divided electrode 105b, the defect can be corrected by the use of the connection region 107, as well.

Figure 17A:
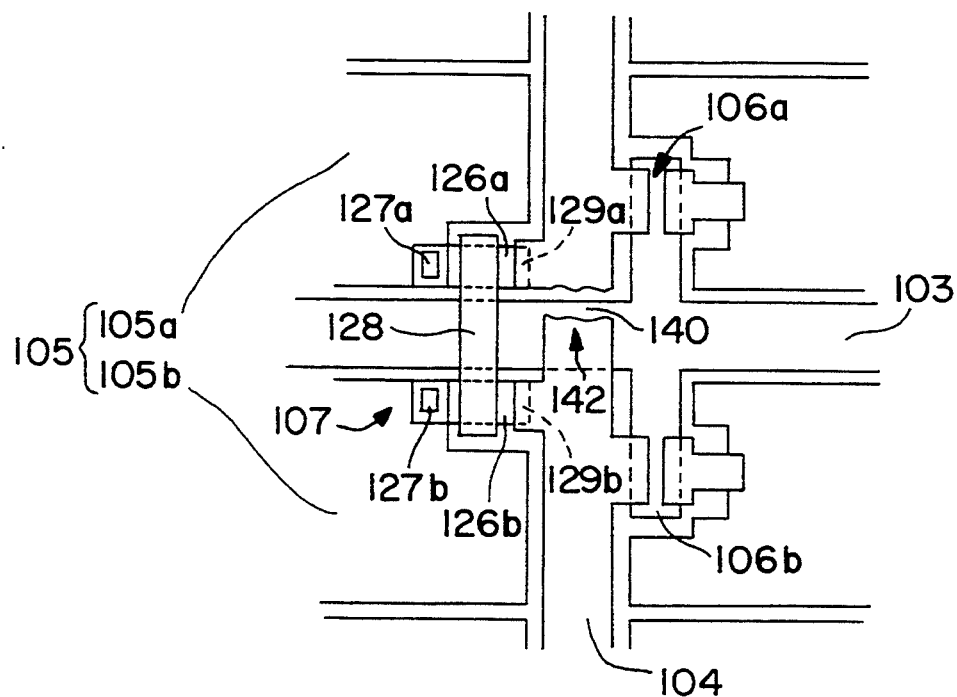
FIGS. 17A and 17B, respectively, are plan views showing an occurrence of defects in an intersection region of bus wirings.
Figure 17B:
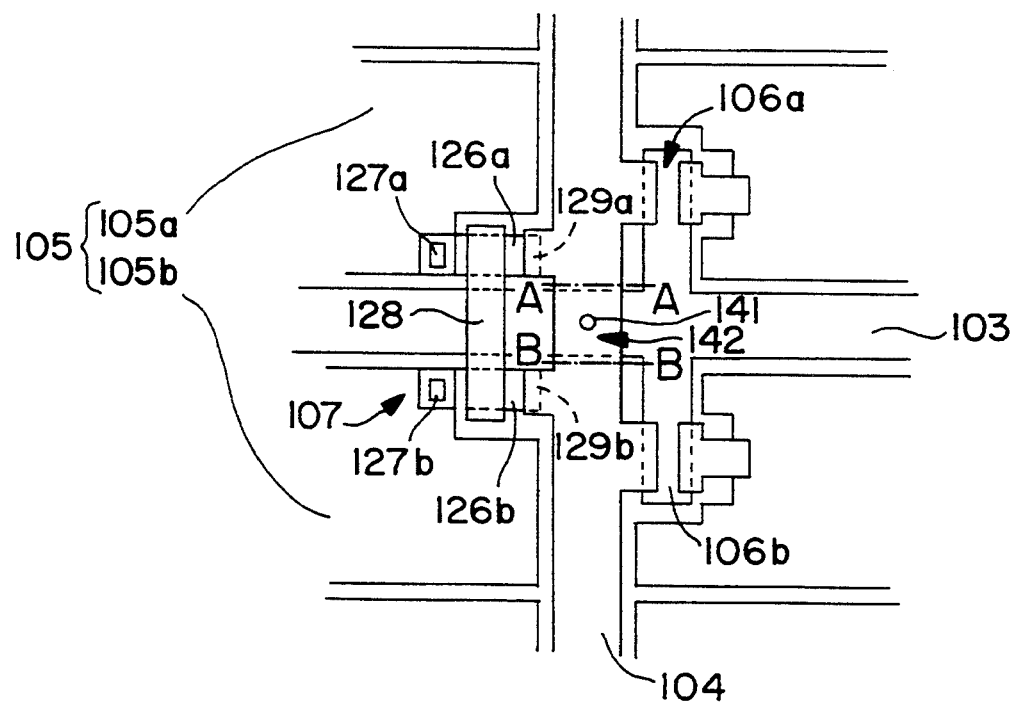

Even when a defective connection of the source bus wiring 104, as shown in FIG. 17A, occurs in an intersection region 142 of the gate bus wiring 103 with the source bus wiring 104, or a defective insulation is, as shown in FIG. 17B, caused by a pin hole or the like between the source bus wiring 104 and the gate bus wiring 103, the connection region 107 of the present example can correct such a defect, the defect appearing as a line defect on the display picture plane.

This correction is performed as follows: first of all, when a defective insulation, as shown in FIG. 17B, occurs due to a pin hole 141, the source bus wiring 104 is cut at a portion between the lines A—A and B—B by a laser beam irradiation. When a disconnection portion 140 is created, as shown in FIG. 17A, the cutting process by means of laser beams is not required. Next, as shown in FIG. 14, the superposed portion where the branch end 129a of source bus wiring 104, gate insulating film 111 and conductor layer 126a are superposed is irradiated with a laser beam. A breakdown occurs in the gate insulating film 111 by irradiation with a laser beam, so that the branch end 129a and conductor layer 126a are fused so as to be connected to each other and become conductive. In the same way as above-mentioned, the superposed portion where the spare wiring 128, gate insulating film 111 and conductor layer 126a are superposed is irradiated with a laser beam. Hence, the gate insulating film 111 is broken and the spare wiring 128 and conductor layer 126a are fused so as to be connected to each other and become conductive. Accordingly, a portion of source bus wiring 104 at one side of the intersection region 142 and the spare wiring 128 are electrically connected by means of the conductor layer 126a.

Likewise, by irradiation with a laser beam, an electrical connection is carried out between the branch end 129b of the source bus wiring 104 and the conductor layer 126b and between the spare wiring 128 and the conductor layer 126b. Hence, a portion of the source bus wiring 104 at the other side of the intersection region 142 and the spare wiring 128 are electrically connected to each other by means of the conductor layer 126b. In this way, these connections are performed in the four portions, so that the two areas of the source bus wiring 104 facing across the intersection region 142 can be electrically connected to each other by means of the connection region 107.

In the present example, although the laser beam is radiated from the glass substrate 101 side, it can be radiated from any substrate if both substrates are made of a material through which laser beams can be transmitted.

Even when the correction of such a picture element defect is performed by the use of laser beams, because the protective coat 117 is formed above the connection region 107, molten metal never enters into the liquid crystal of a display medium. The protective coat 117 is a transparent insulator through which a laser beam is transmitted. Accordingly, there is no fear that the protective coat 117 is broken by a laser beam. A liquid crystal layer in the vicinity of an area irradiated by a laser beam may become milky, after which the milky portion soon disappears, so the image quality of this display apparatus never decreases.

Figure 18:
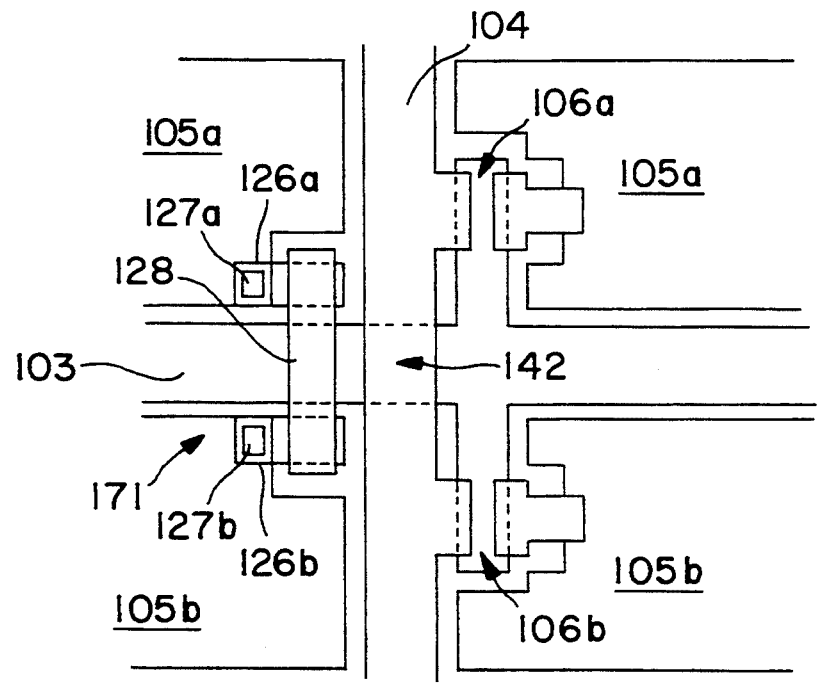
FIGS. 18 and 19, respectively, are plan views showing other connection regions of the substrate.

In the example with regard to FIG. 12, the connection region 107 has two defect-correction functions, one of which is that a picture element defect caused at the divided electrode 105a or 105b is corrected, and the other of which is a defective insulation of the intersection region 142 or a defective disconnection of the source bus wiring 104 are corrected, but it may have only one of the two functions. FIG. 18 shows a connection region 171 having one function by which the correction of a picture element defect can be performed, in which a source bus wiring 104 is not provided with the branch ends 129a and 129b, and the connection region 171 is so constructed that the branch end 129a and a portion of the conductor layer 126a positioned under the branch end 129a are eliminated from the connection region 107 shown in FIG. 14.

Figure 19:
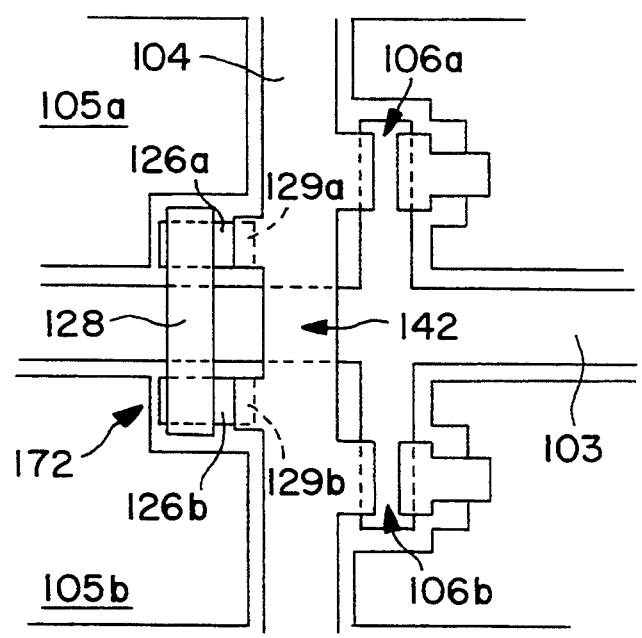

FIG. 19 shows another connection region 172 having the other function by which the correction of a defective insulation of the intersection region 142 or the source bus wiring 104 can be performed, in which the connection region 172 is not provided with the conductor pieces 127a and 127b, and the connection region 172 is so constructed that the conductor piece 127a and a portion of the conductor layer 126a positioned under the conductor piece 127a are removed from the connection region 107 shown in FIG. 14.

EXAMPLE 5

Figure 20:
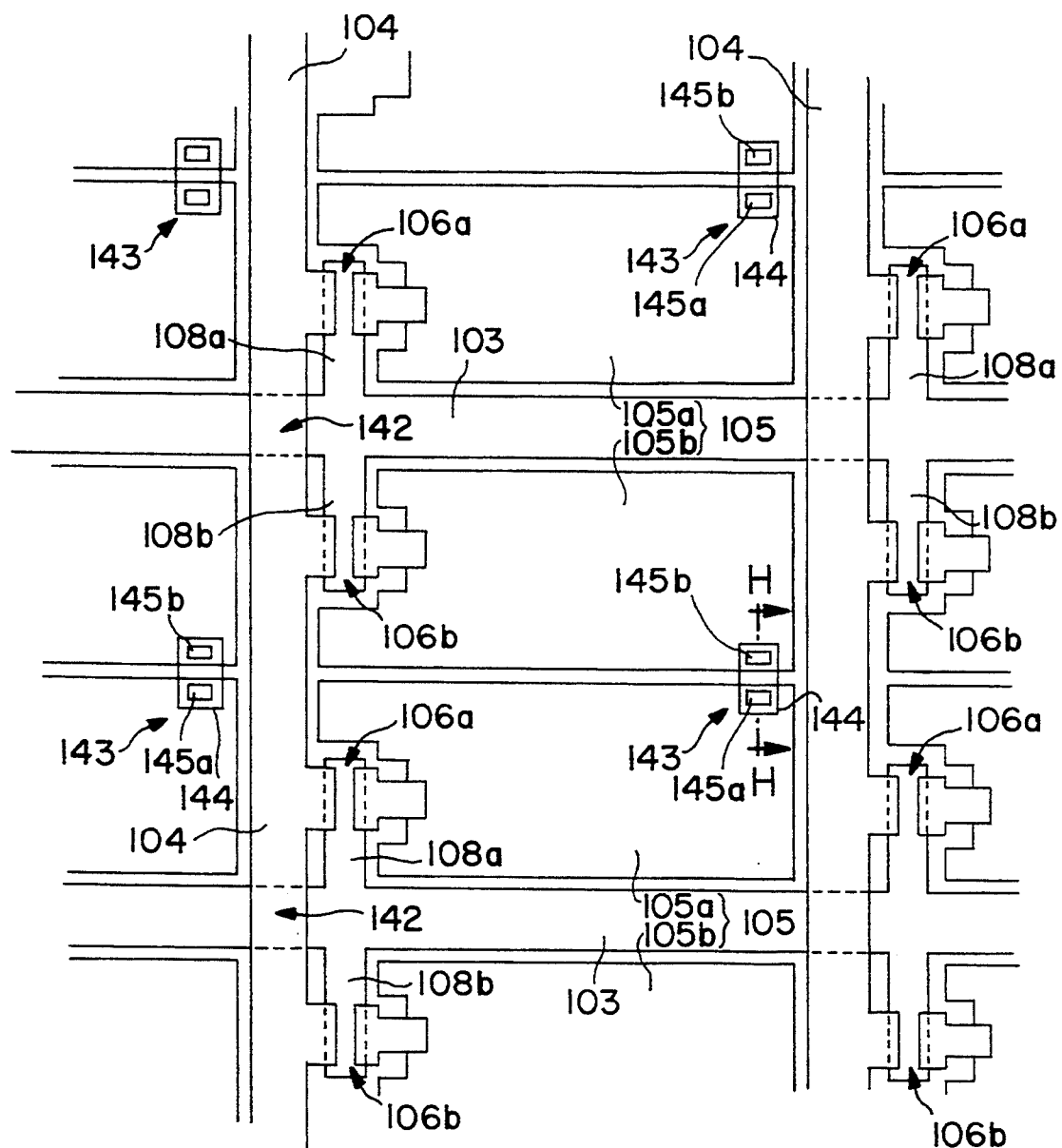
FIG. 20 is a plan view showing an active matrix substrate that is used in still another display apparatus of this invention.
Figure 21:
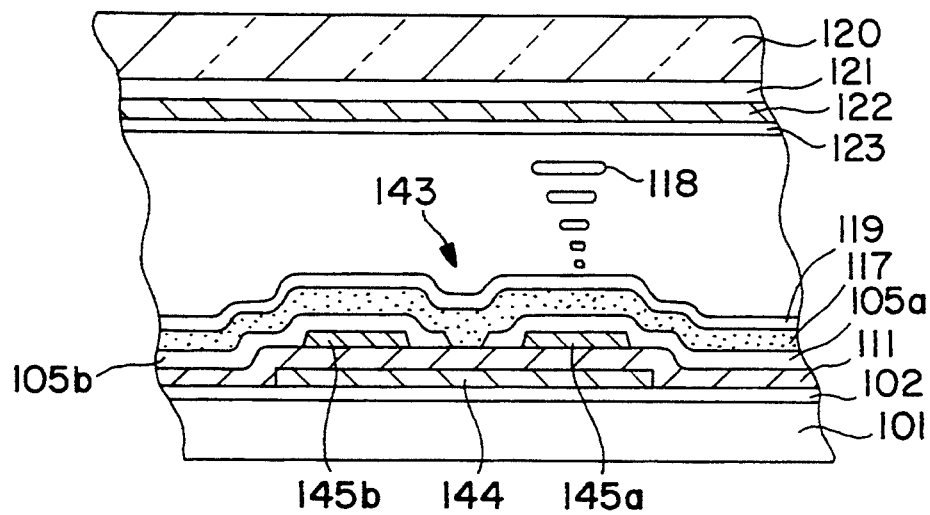
FIG. 21 is a sectional view taken along the line H—H of FIG. 20.

FIG. 20 shows an active matrix substrate used for still another display apparatus of the invention, in which each picture element electrode 105 is divided into two divided electrodes 105a and 105b in the same manner as that of Example 4, and a connection 143 is provided between one divided electrode 105a of the said picture element electrode 105 and a divided electrode 105b of a picture element electrode adjacent to the said picture element electrode 105. FIG. 21 is a sectional view taken on the line H—H in FIG. 20, in which a base coat 102 disposed on the entire surface of a glass substrate 101, and an electrically conductive film 144 is disposed on the base coat 102 and can be formed simultaneously with a gate bus wiring 103. An insulating film 111 is disposed to cover the entire surface of the electrically conductive film 144. Metal pieces 145a and 145b are disposed above both ends of electrically conductive film 144 so as to sandwich the gate insulating film 11 therebetween. These pieces 145a and 145b can be formed sumultaneously with a source bus wiring 104. On the metal pieces 145a and 145b are disposed the divide electrodes 105a and 105b, respectively, the connection 143 being completely covered by the protective coat 117.

In the same way as that of the example with regard to FIG. 12, a liquid crystal display apparatus of the above-mentioned structure is driven to confirm the position where a picture element defect occurs. When a picture element defect occurs in either the divided electrode 105a or 105b due to a defect of the TFT 106a or 106b aor a defective connection of a gate branch 108a or 108b, the picture element defect can be easily corrected by the use of the connection 143. A case that a defect occurs in the TFT 106a or the gate branch 108a, which causes a picture element defect in the divided electrode 105a, will be exemplified. In this case, the laser beam is, likewise, radiantad from the outside of the display apparatus to the superposed portions where the electriclly conductive film 144 is superposed on the metal pieces 145a and 145b, so that electrically connecting the divided electrode 105a can be electrically connected to the divided electrode 105b of the picture element electrode that is adjacent to the said divided electrode 105a.

In this way, when a picture element defect is corrected by the use of the connection 143, the defective divided electrode 105a is driven by the TFT 106b of the adjacent picture element electrode. Therefore, although the divided electrode 105a cannot perform ist inherent display operation, an occurrence of picture element defects can be avoided. Moreover, in the present example, it is possible to disconnect the TFT 106a from the defective divided electrode 105a, as desired. In a case that a picture element defect occurs in the divided electrocde 105b, the defect is corrected in the same way as the above-mentioned.

Figure 22:
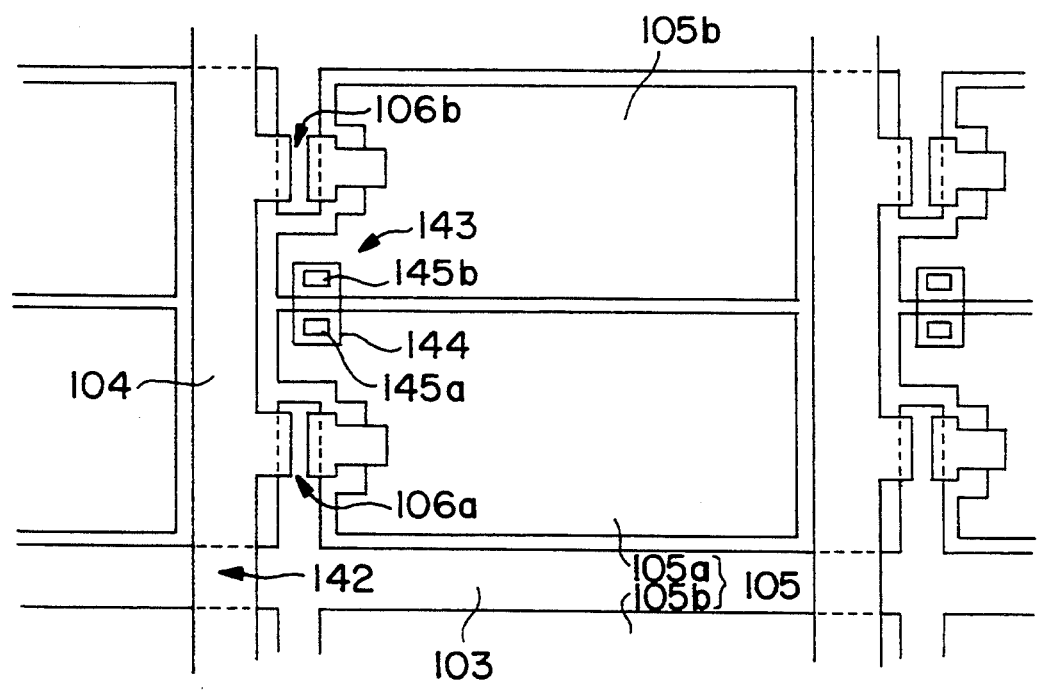
FIG. 22 is a plan view showing a connection positioned in the vicinity of a TFT of still another display apparatus of this invention.

In the present example, although the connection 143 is procided at a position to be the furtherest from the TFTs 106a and 106a, it can be provided at any position so long as the position is adjacent to the divided electrodes 105a and 105b; for example, as shown in FIG. 22, the connection 143 can be provided in the vicinity of the respective TFTs 106a and 106b.

Figure 23:
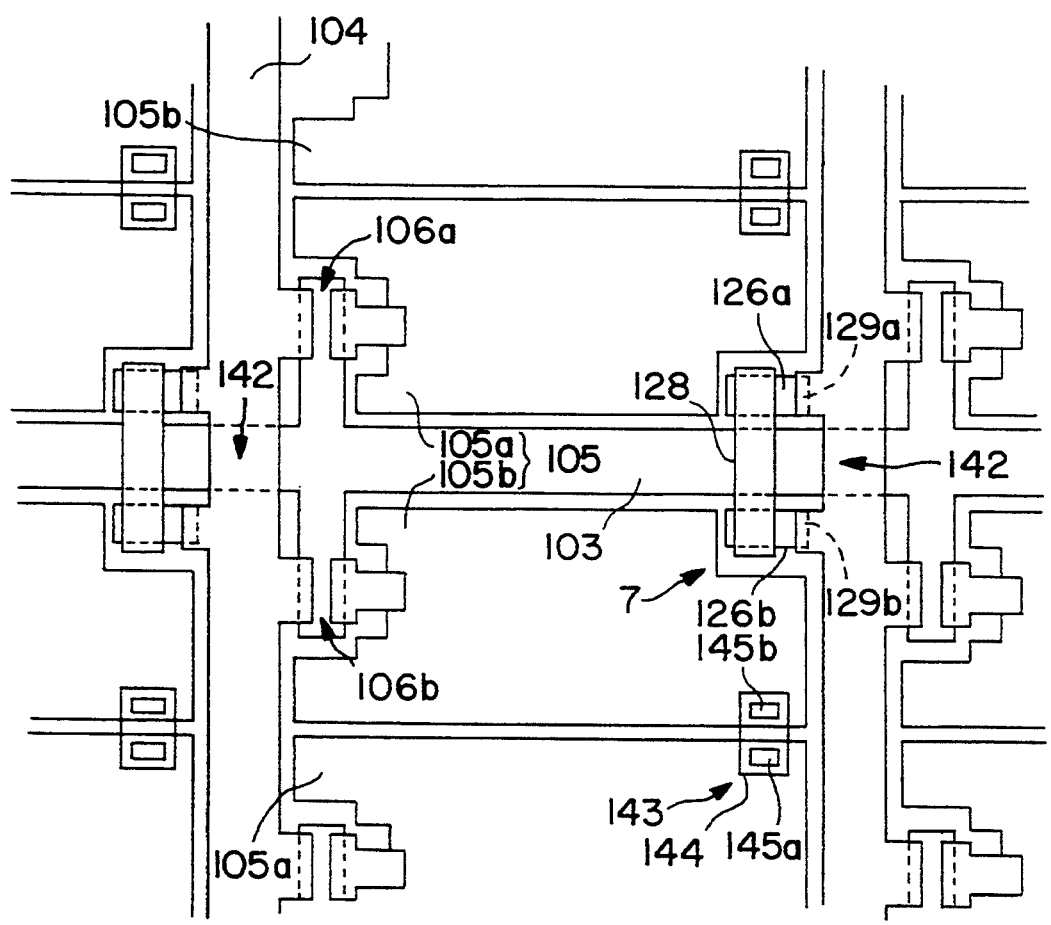
FIG. 23 is a plan view showing an active matrix with a combination of a connection and a connection region that is used in still another display apparatus of this invention.
Figure 24:
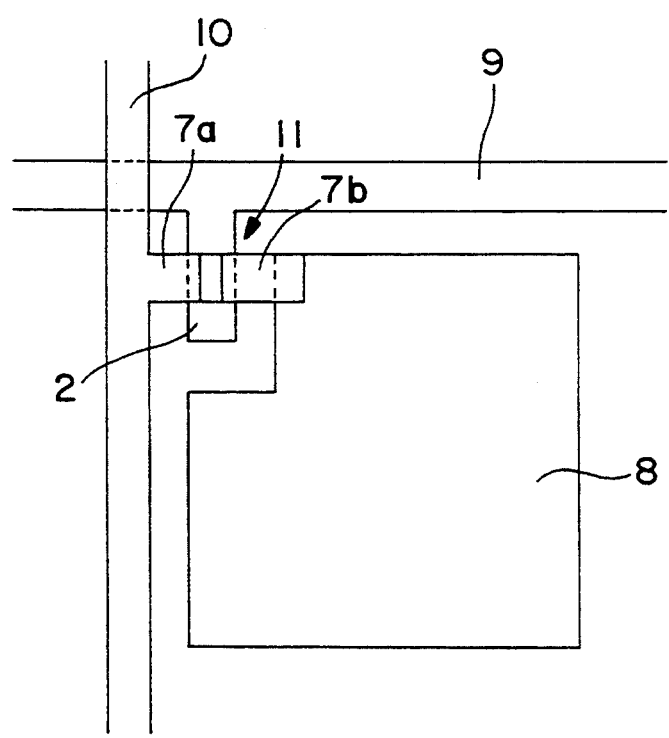
FIG. 24 is a plan view showing a conventional active matrix substrate.
Figure 25:
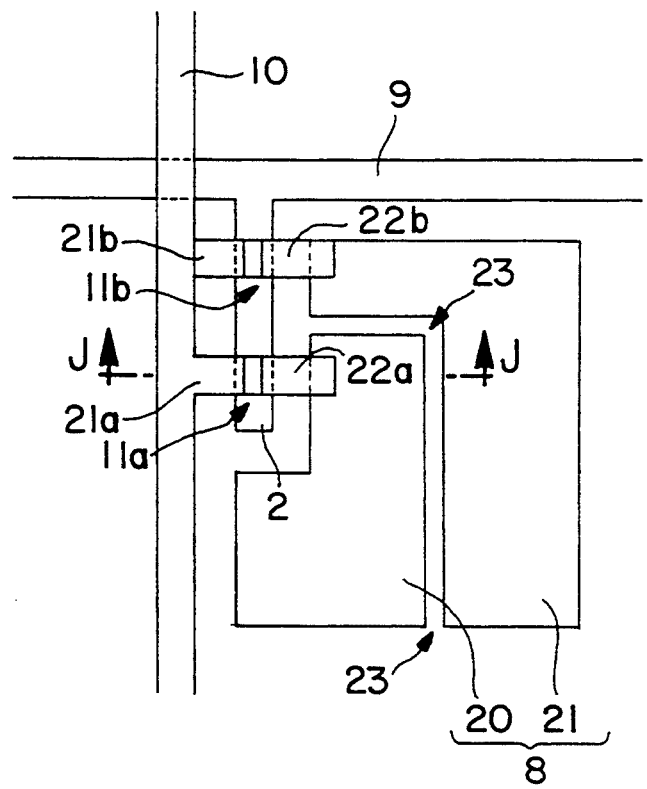
FIG. 25 is a plan view showing another conventional active matrix substrate with picture element electrodes, each of which is divided into two divided electrodes.
Figure 26:
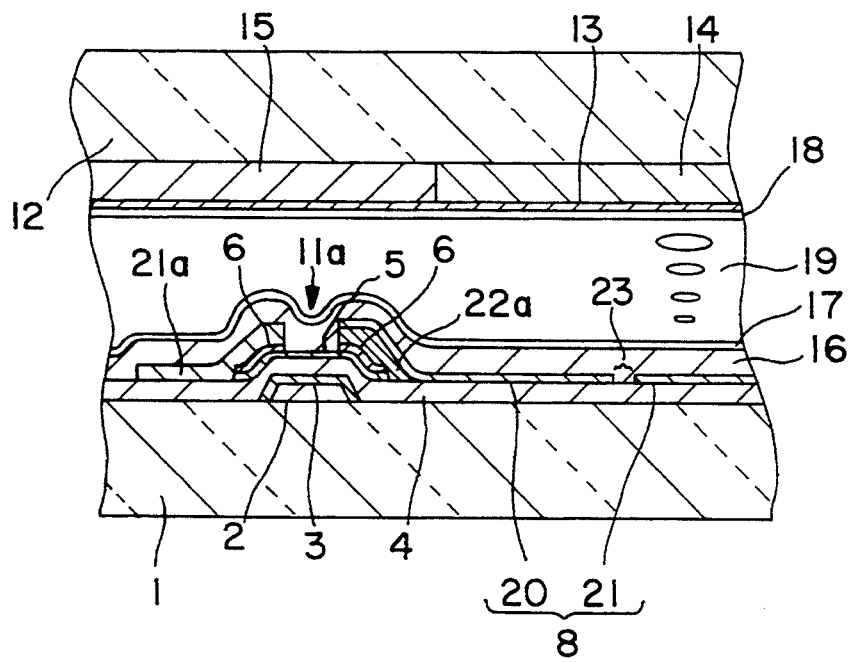
FIG. 26 is a sectional view showing a display apparatus with the substrate of FIG. 25, the view being take along the line J—J of FIG. 25.
Figure 27:
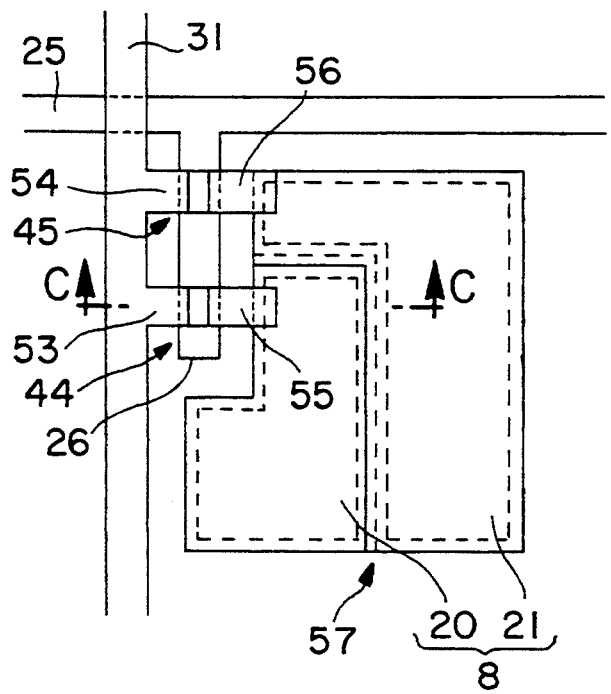
FIG. 27 is a plan view showing still another conventional active matrix substrate.

Although picture element defects can be corrected by the use of the connection 143, a line defect caused by a defect in the intersection region 142 of the bus wiring such as that of the example shown in FIG. 12 cannot be corrected. FIG.23 shows still another display apparatus with an active matrix substrate having a function to correct the above-mentioned line defect. This active matrix substrate has a construction in which the connection 143 of the example in FIG. 20 is combined with the connection region 172 of the example in FIG. 19.

As mentioned above, with the active matrix display apparatus of the present example, picture element defects or line defects caused by defects of the switching element or the bus wiring can be easily specified and corrected while the display apparatus is performing a display. Accordingly, the inspection process and correction process can be facilitated, which makes mass production easy, and this display apparatus can be produced at a low cost.

Examples 4 and 5 mentioned above are provided with the base coats 102 respectively, but the base coats 102 is not absolutely required. Moreover, any of the above-mentioned examples discloses a transmission type liquid crystal display apparatus, but the present invention is, of course, applicable to a reflection type display apparatus. Furthermore, although the above-mentioned examples disclose the active matrix liquid crystal apparatus using TFTs, but the present invention is also applicable to display apparatuses using various switching elements, such as an MIM element, a diode or a varistor. Also, the present invention is applicable to various display apparatuses using, as a display medium, a thin film light emission layer, a dispersion type EL light emission layer, a plasma luminosity, or the like.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix substrate comprising:
   transparent picture element electrodes disposed in a matrix on an insulating substrate, each of said picture element electrodes being composed of a plurality of divided electrodes;
   a gate bus wiring and a source bus wiring intersecting with each other and being connected to each of said divided electrodes through a switching element; and
   an electrically conductive film being of the same material as said gate bus wiring, on which a portion of each of two of said divided electrodes that are adjacent to each other is superposed, each of said portions of the two divided electrodes and said electrically conductive film being disposed in a nonconductive state with an insulating film sandwiched therebetween, resulting in a connection portion;

wherein a pair of metal pieces, respectively, are disposed between one of said portions of the two divided electrodes and said insulating film and between the other of said portions of the two divided electrodes and said insulating film at edge portions of said divided electrodes;

wherein a hole is formed for said insulating film in a portion thereof positioned between one of said pair of metal pieces and said electrically conductive film;

wherein said connection portion is covered with a protective coat so as to be confined between said protective coat and said insulating substrate; and wherein one of said two divided electrodes detected as a defect is capable of being electrically connected with the other of said two divided electrodes by irradiating said edge portions of the divided electrodes with laser from outside of said insulating substrate.

2. An active matrix display apparatus comprising;
a first substrate which is translucent, and a second substrate;
a display medium which is charged between said first and second substrates, the optical characteristics of said display medium being modulated in response to an applied voltage;
transparent picture element electrodes disposed in a matrix on said first substrate, each of said picture element electrodes being composed of a plurality of divided electrodes;
an opposite electrode disposed on said second substrate;
a gate bus wiring and a source bus wiring intersecting with each othe and being connected to each of said divided electrodes through a switching element; and
an electrically conductive film on which a portion of each of two of said divided electrodes that are adjacent to each other is superposed, at least one of said portions of the tow divided electrodes and said electrically conductive film being disposed in a nonconductive state with an insulating film sandwiched therebetween, resulting in a connection portion;
wherein said connection portion is covered with a protective insulating coat so as to be isolated from said display medium; and
wherein one of said two divided electrodes detected as a defect is capable of being electrically connected with the other of said two divided electrodes by irradiating said connection portion with laser from outside of said first substrate.

3. A active matrix display apparatus according to claim 2, wherein a pair of metal pieces, respectively, are disposed between one of said portions of the two divided electrodes and said insulating film and between the other of said portions of the two divided electrodes and said insulating film .

4. An active matrix display appartus as set forth in claim 3, wherein a hole is disposed in a portion of said insulating film positioned between one of said pair of metal pieces and said electrically conductive film.

5. An active matrix display apparatus according to claim 2, wherein said electrically conductive film is electrically connected with one of said portions of the two divided electrodes.

6. An active matrix display apparatus according to claim 2, wherein each of said divided electrodes comprises an upper layer divided electrode and a lower divided electrode and said electrically conductive film is disposed so that it faces each of said upper layer divided electrodes so as to sandwich said insulating film therebetween in a non-conductive state, thereby constituting said connection portion.

7. An active matrix display apparatus according to claim 6, wherein a pair of metal pieces are disposed at said connection portion between said two upper layer divided electrodes and said insulating film.

8. An active matrix display apparatus according to claim 6, wherein said lower layer divided electrode of one of said two adjacent divided electrodes and said electrically conductive film are electrically connected with each other at said connection portion.

9. An active matrix display apparatus comprising:
a first substrate which is translucent, and a second substrate;
a display medium charged between said first and second substrates, the optical characteristics of said display medium being modulated in response to an applied voltage;
transparent picture element electrodes disposed in a matrix on said first substrate, each of said picture element electrodes being composed of a pair of divided electrodes;
an opposite electrode disposed on said second substrate;
a gate bus wiring disposed between said divided electrodes, and a source bus wiring intersecting with said gate bus wiring, said gate bus wiring and said source bus wiring being connected to each of said divided electrodes through a switching element; and
an electrically conductive film on which a portion of each of two of said divided electrodes is superposed, said two divided electrodes constituting two of said picture element electrodes that are adjacent to each other, said electrically conductive film being of the same material as said gate bus wiring;
wherein a pair of metal pieces are superposed on both ends of said electrically conductive film so as to sandwich an insulating film therebetween, in a non-conductive state, and said portions of the divided electrodes are superposed on said metal pieces in a conductive state respectively, resulting in a connection portion;
wherein said connection portion is covered with a protective insulating coat so as to be isolated from said display medium; and
wherein one of said two divided electrodes detected as a defect is capable of being electrically connected with the other of said two divided electrodes by irradiating said connection portion with laser from outside of said first substrate.

10. A method of correcting a picture element defect of an active matrix display apparatus, comprising the steps of:
assembling an active matrix display apparatus which comprises a first substrate which is translucent and a second substrate, a display medium which is charged between said first and second substrates, the optical characteristics of said display medium being modulated in response to an applied voltage, picture element electrodes disposed in a matrix on said first substrate, each of said picture element electrodes being composed of a plurality of divided electrodes, an opposite electrode disposed on the other of said substrates, a gate bus wiring and a source bus wiring intersecting with each other and being connected to each of said divided electrodes through a switching element, and an electrically conductive film on which a portion of each of two of said divided electrodes that are adjacent to each other is superposed, at least one of said portions of the two divided electrodes and said electrically conductive film being disposed in a non-conductive state with an insulating film sandwiched therebetween, resulting in a connection portion, wherein said connection portion is covered with a protective insulating coat so as to be isolated from said display medium;

putting the entire display picture plane of said active matrix display apparatus in a display state so as to detect a picture element defect which occurred in one of said two divided electrodes; and irradiating said connection portion with laser from outside of said first substrate so as to electrically connect said divided electrode detected as a defect with the other of said two divided electrodes.

11. A correcting method according to claim 10, wherein a pair of metal pieces, respectively, are disposed between one of said portions of the two divided electrodes and said insulating film and between the other of said portions of the two divided electrodes and said insulating film.

12. A correcting method according to claim 11, wherein a hole is disposed in a portion of said insulating film positioned between one of said pair of metal pieces and said electrically conductive film.

13. A correcting method according to claim 10, wherein said electrically conductive film is electrically connected with one of said portions of the two divided electrodes.

14. A correcting method according to claim 10, wherein each of said divided electrodes comprises an upper layer divided electrode and a lower layer divided electrode and said electrically conductive film is disposed so that it faces each of said upper layer divided electrodes so as to sandwich said insulating film therebetween in a non-conductive state, thereby constituting said connection portion.

15. A correcting method according to claim 14, wherein a pair of metal pieces are disposed at said connection portion between said two upper layer divided electrodes and said insulating film.

16. A correcting method according to claim 14, wherein said lower layer divided electrode of one of said two adjacent divided electrodes and said electrically conductive film are electrically connected with each other at said connection portion.

17. A method of correcting a picture element defect of an active matrix display apparatus, comprising the steps of:

assembling an active matrix display apparatus which comprises a first substrate which is translucent, a display medium charged betwen said first and second substrates, the optical characteristics of said display medium being modulated in response to an applied voltage, transparent picture element electrodes disposed in a matrix on said first substrate, each of said picture element electrodes being composed of a pair of divided electrodes, an opposite electrode disposed on the other hand of said substrates, a gate bus wiring disposed between said divided electrodes, and a source bus wiring intersecting with said gate bus wiring, said gate bus wiring and said source bus wiring being connected to each of said divided electrodes through a switching element, and an electrically conductive film on which a portion of each of two of said divided electrodes is superposed, said two divided electrodes constituting two of said picture element electrodes that are adjacent to each other, said electrically conductive film being of the same material as said gate bus wiring, wherein a pair of metal pieces are superposed on both ends of said electrically conductive film so asto sandwich an insulating film therebetween, in a non-conductive state, and said portions of the divided electrodes are superposed on said metal pieces in a conductive state respectively, resulting in a connection portion, wherein said connection portion is covered with a protective insulating coat as to be isolated from display medium;

putting the entire display picture plane of said active matrix display apparatus in a display state so as to detect a picture element defect which occurred in one of said two divided electrodes; and irradiating said connection portion with laser from outside of said first substrate so as to electrically connect said divided electrode detected as a defect with the other of said two divided electrodes.

* * * * *

UNITED STATES PATENT AND TRADEMARK OFFICE
CERTIFICATE OF CORRECTION

PATENT NO.  : 5,343,216
DATED       : August 30, 1994
INVENTOR(S) : Mikio Katayama, et al.

It is certified that error appears in the above-indentified patent and that said Letters Patent is hereby corrected as shown below:

column 21, line 58:   "perform ist inherent"
                      Should read --perform its inherent--;

column 21, line 67:   "is procided"
                      Should read --is provided--;

column 21, line 68:   "106a and 106a"
                      Should read --106a and 106b--.

Claim 2, Column 23, line 34: "othe" should read --other--;
Claim 2, column 23, line 40: "tow"  should read --two--;
Claim 3, column 23, line 53: "A"    should read --An--;
Claim 6, column 24, lines 1-2: "lower divided"
                      should read --lower layer divided--;
Claim 17, column 26, line 18; "the other hand"
                      should read --the other--;
Claim 17, column 26, line 32: "asto" should read --as to--;
Claim 17, column 26, line 38: "coat as"
                      should read --coat so as--;
Claim 17, column 26, line 39: "from display"
                      should read --from said display--.

Signed and Sealed this

Twenty-first Day of February, 1995

Attest:

BRUCE LEHMAN

*Attesting Officer*                    *Commissioner of Patents and Trademarks*